(12) United States Patent
De Muelenaere et al.

(10) Patent No.: US 9,692,929 B2
(45) Date of Patent: Jun. 27, 2017

(54) METHOD AND SYSTEM FOR CORRECTION OF AN IMAGE FROM A HAND-HELD SCANNING DEVICE

(71) Applicants: Pierre De Muelenaere, Court-Saint-Etienne (BE); Michel Dauw, Diegem (BE); Patrick Verleysen, Wavre (BE); Rene Barbier, Andenne (BE)

(72) Inventors: Pierre De Muelenaere, Court-Saint-Etienne (BE); Michel Dauw, Diegem (BE); Patrick Verleysen, Wavre (BE); Rene Barbier, Andenne (BE)

(73) Assignee: I.R.I.S., Mont-Saint-Guibert (BE)

( * ) Notice: Subject to any disclaimer, the term of this patent is extended or adjusted under 35 U.S.C. 154(b) by 7 days.

(21) Appl. No.: 14/840,670

(22) Filed: Aug. 31, 2015

(65) Prior Publication Data
US 2017/0064126 A1    Mar. 2, 2017

(51) Int. Cl.
H04N 1/047    (2006.01)
G06K 9/22    (2006.01)
G06K 9/36    (2006.01)

(52) U.S. Cl.
CPC ............ *H04N 1/047* (2013.01); *G06K 9/228* (2013.01); *G06K 2009/363* (2013.01); *G06K 2209/01* (2013.01); *H04N 2201/0081* (2013.01); *H04N 2201/0096* (2013.01)

(58) Field of Classification Search
None
See application file for complete search history.

(56) References Cited

U.S. PATENT DOCUMENTS

| 5,023,922 A | 6/1991 | Abramovitz et al. |
| 5,083,218 A | 1/1992 | Takasu et al. |
| 5,974,204 A | 10/1999 | Lin et al. |
| 6,104,845 A | 8/2000 | Lipman et al. |

(Continued)

FOREIGN PATENT DOCUMENTS

SE    WO 98/20446    5/1998

OTHER PUBLICATIONS

A. L. Spitz. (need title of book), "Handbook of Character Recognition and Document Image Analysis". Chapter 9. Mutilingual Document Recognition, Section 3: Text Image Processing, pp. 263-268. Jan. 1, 1997. World Scientific Publishing, Singapore.

(Continued)

*Primary Examiner* — Mohammad Ghayour
*Assistant Examiner* — Lennin Rodriguezgonzale
(74) *Attorney, Agent, or Firm* — Jerold I. Schneider; Schneider Rothman Intellectual Property Law Group, PLLC

(57) ABSTRACT

A method for correcting an image acquired by a hand-held scanning device. A binarized image of an acquired image is cropped by removing columns on the left end and on the right end of only first components. A work image is created from the cropped image by replacing in each row of components series of first components smaller than a predetermined distance with series of second components. In the work image, a central line is identified. The identified central line in the work image is used to identify the corresponding central line in the cropped image forming a central line image, and in the central line image, the central text line is straightened.

14 Claims, 22 Drawing Sheets

(56) References Cited

U.S. PATENT DOCUMENTS

| | | | |
|---|---|---|---|
| 6,509,893 B1 | 1/2003 | Akhlagi et al. | |
| 6,529,645 B2 | 3/2003 | Fahraeus et al. | |
| 6,965,703 B1 | 11/2005 | Regev | |
| 2006/0193533 A1* | 8/2006 | Araki | G06K 9/3283 |
| | | | 382/275 |
| 2011/0063456 A1* | 3/2011 | Ohnishi | G06T 7/0002 |
| | | | 348/207.2 |
| 2012/0033269 A1* | 2/2012 | Ito | H04N 1/12 |
| | | | 358/498 |

OTHER PUBLICATIONS

Nafiz Arica and Fatos T. Yarman-Vural. "An Overview of Character Recognition Focused on Off-Line Handwriting", IEEE Transactions on Systems, Man, and Cybernetics—Part C: Applications and Reviews, vol. 31. May 2, 2001. pp. 216-233. IEEE Service Center, Piscataway, NJ. US.

\* cited by examiner a pen-input
to-digital co1
digital-to-an;

FIG. 11

METHOD AND SYSTEM FOR CORRECTION OF AN IMAGE FROM A HAND-HELD SCANNING DEVICE

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION BY REFERENCE OF MATERIAL SUBMITTED ON A CD OR AS A .TXT FILE VIA EFS-WEB

Not applicable

STATEMENT REGARDING PRIOR DISCLOSURES BY THE INVENTOR OR A JOINT INVENTOR

Not applicable

FIELD OF THE INVENTION

The present invention relates to a method for processing an image acquired by a hand-held scanning device, and more is particularly related to a method for providing correction of an image from a hand-held scanning device. The present invention further relates to a hand-held scanning device and a hand-held scanning device system using the method for processing, and is more particularly related to a device and system using the method of correction of a distorted image.

BACKGROUND

Optical character recognition (OCR) hand-held scanners are known. They convert the image of a printed text, barcode or picture into a machine-readable code. Often, the image acquired by the hand-held scanning device is transferred to the PC/Mac which then performs the following steps: process the image to improve the quality, OCR the text, and export the recognized text to an application. An example of an OCR hand-held scanner known in the art is a pen scanner. A pen scanning device is a scanning device shaped like a pen usually connected to a computer. The pen scanning device is operated by hand and allows to enter a line of text into a computer application by sliding the pen on the document.

The OCR hand-held scanners comprise a one dimensional optical sensor for acquiring image information which is managed by a processing unit and stored in a memory. For a hand-held scanner, the hand-held scanner is passed over a printed text by the user such that there is relative movement between the optical sensor and the printed text to be acquired. During such relative movement, a series of images are acquired in which each acquired image corresponds to a small portion of the printed text to be scanned. When the scanned image is to be reconstructed, a distorted image results from the combined acquired images.

Since a one dimensional sensor is used, the problem occurred how to calculate the instantaneous scanning speed which is needed to rebuild the two dimensional image. Solutions to correct this distortion in the scanned image are known in the art.

Some solutions have been based on mechanical structures such as small wheels being in contact with the paper and allowing to calculate the speed. U.S. Pat. No. 5,083,218 discloses a hand-held image reading apparatus in which a rubber roller moves over the surface of the image to determine the relative movement between the hand-held scanning device and the image being scanned or acquired.

In another solution disclosed in U.S. Pat. No. 5,023,922, a two-dimensional optical sensor is used for calculating the speed of the relative movement based on the time interval required for an image to transverse the sensor.

In still another solution, U.S. Pat. No. 6,965,703 discloses to correct the distortion caused by the variability of the instantaneous scanning speed by applying a compensation. This solution utilizes the character height and font ratio for each font in the text to obtain a local correction factor at each location in the text image. The local correction factor is subsequently used to correct the distorted image. Although, the above solutions provide, in many cases, more than reasonable results, the resulting OCR accuracy is, in a number of situations, still too low especially because the hand-held device is operated by hand. Since the hand-held scanning device is operated by hand, the user himself introduces various kinds of distortions in the scanned images which are not caused by changing the speed of the hand-held scanning device.

SUMMARY

It is an aim of the present invention to provide a method for correcting an image acquired by a hand-held scanning device which results in an improved OCR accuracy. This aim is achieved according to the invention with a method for correction of an image acquired by a hand-held scanning device showing the technical characteristics of the first independent claim. The method comprising the steps of:
  binarizing the image acquired by a hand-held scanning device to become a binarized image of first and second components,
  cropping the binarized image to become a cropped image by removing columns on the left end and on the right end of only first components,
  creating a work image from the cropped image by replacing in each row of components series of first components smaller than a predetermined distance with series of second components,
  identifying in the work image a central line,
  determining in the cropped image the components corresponding to the central line in the work image as a central text line to create a central line image, and
  straightening the central text line in the central line image to become a corrected image.

The above method to correct image distortion using a work image to determine the central line in the image is resulting in very consistent high quality results which form the perfect basis for a subsequent character recognition process.

In embodiments of the invention, the step of identifying in the work image a central line comprises:
  selecting first connected components for which a leftmost triplet is part of the leftmost column of the cropped image, determining couples of first connected components of which the distance between the middle points of the leftmost triplets is between a predetermined range, selecting in the couples of first connected components the couple of first connected components nearest to the middle of the cropped image in the column direction, and determining the central line as the components between the selected couple of first connected components.

This embodiment has as advantage that the central line can be selected very fast with high accuracy.

In embodiments of the invention, the step of straightening the central text line comprises:

blurring the central line image to become a blurred image, determining in the blurred image for each column of component a gravity centre of second components, and translating for each column the gravity centres such that the gravity centres forming a horizontal line.

This embodiment is advantageous because it results in a consistent high accuracy for straightening the text line.

In embodiments of the invention, the first components are white components and the second components are black components. In embodiments of the invention, the method comprises the step of applying a variable speed correction to the acquired image before binarizing. It has been found that applying two image distortion corrections on the acquired image provides a very high accuracy.

In embodiments of the invention, the step of applying speed correction comprises mechanically measuring the speed variations of the hand-held scanning device with respect to the image to be acquired. Mechanically measuring the speed and applying a speed correction before binarization has found to provide very good and consistent results of correction.

In embodiments of the invention, the method comprises the step of applying a variable speed correction to the corrected image to become a second corrected image. In this method the speed correction is executed after identifying the central text line. It is found that this provides very good results.

In embodiments of the invention, the speed correction comprises calculating local correction factors based on font information. This method is advantageous, especially because of the combination of first providing a correction on the distortions caused by instantaneous change of scanning direction and identifying the central line and subsequently applying a correction on the distortions caused by instantaneous change of speed using calculated local correction factors.

In embodiments of the invention, the method comprises the step of applying a character recognition process on the second corrected image to become text information. It is found that the combination of pre-processing an image as described in one of the embodiments of the invention and subsequently applying a character recognition process provides a very accuracy.

In embodiments of the inventions, the method comprises the step of applying a data extraction process on the text information to become classified text information. It is also found that the combination of pre-processing an image as described in one of the embodiments of the invention and subsequently applying character recognition and data extraction, provides excellent results.

It is another aim of the present invention to provide a hand-held scanning device for acquiring an image and for pre-processing the acquired image such that any subsequent OCR results in a better OCR accuracy. This aim is achieved according to the invention with a hand-held scanning device for scanning an image and for pre-processing the image for pattern recognition, the device comprising an optical sensor for scanning an image having at least one central text portion, a processor for correcting the scanned image, and a storage containing a program executable by means of the at least one processor and comprising:

first software code portions configured for binarizing the scanned image in a binarized image of first and second components, second software code portions configured for cropping the binarized image to a cropped image by removing columns on the left end and on the right end of only first components, third software code portions configured for creating a work image from the cropped image by replacing in each row of components series of first components smaller than a predetermined distance with series of second components, fourth software code portions configured for identifying in the work image a central line, fifth software code portions configured for determining in the binarized image or in the cropped image the components corresponding to the central line in the work image as a central text line to create a central line image, and sixth software code portions configured for straightening the central text line in the central line image to a corrected image.

This embodiment is advantageous as the pen provides a pre-processed image which is pre-processed in such a way that it provides better OCR results when a character recognition process is applied subsequently on the pre-processed image.

In embodiments of the invention, the hand-held scanning device comprises a wireless communication module for communicating images to a wireless communication module of a mobile device. This has the advantage that a connection can easily be established and that there are no limitation caused by wires. If results in a very flexible way of using the hand-held scanning device.

It is another aim of the present invention to provide a system for correcting an image acquired by a hand-held scanning device such that any subsequent OCR results in a better OCR accuracy. This aim is achieved according to the invention with a system for correction of an image having at least one central text portion which is distorted by instantaneous change of scanning direction relative to an image to be acquired, the system comprising at least one processor and an associated storage containing a program executable by means of the at least one processor and comprising:

first software code portions configured for binarizing the scanned image in a binarized image of first and second components, second software code portions configured for cropping the binarized image to a cropped image by removing columns on the left end and on the right end of only first components, third software code portions configured for creating a work image from the cropped image by replacing in each row of components series of first components smaller than a predetermined distance with series of second components, fourth software code portions configured for identifying in the work image a central line, fifth software code portions configured for determining in the binarized image or in the cropped image the components corresponding to the central line in the work image as a central text line to create a central line image, and sixth software code portions configured for straightening the central text line in the central line image to a corrected image.

The advantage of this system is that it provides a very accurate pre-processing on the scanned image such that any subsequent character recognition process provides very accurate results.

In embodiments of the invention, the system comprises a handheld scanning device for scanning the image and a mobile device comprising the processor and the associated storage. The advantage of this system that the equipment in the hand-held scanning device can be limited which is advantageous for the size of the scanning device, the production cost of the scanning device and the design of the scanning device.

In embodiments of the invention, the handheld scanning device comprises a wireless communication module to communicate with a second wireless communication module in the mobile device. This system has the advantage that it's very easy to connect, disconnect and switch between mobile devices. Further, the wireless connection also avoids the typical limitations of a wired connection such as limited distance, connector compatibility, and the fact that cable disturb the handling of the hand-held mobile device.

BRIEF DESCRIPTION OF THE DRAWINGS

The invention will be further elucidated by means of the following description and the appended figures.

FIG. 11 illustrates a connection between characters in two lines; and

DETAILED DESCRIPTION OF THE DRAWINGS

Figure 1:
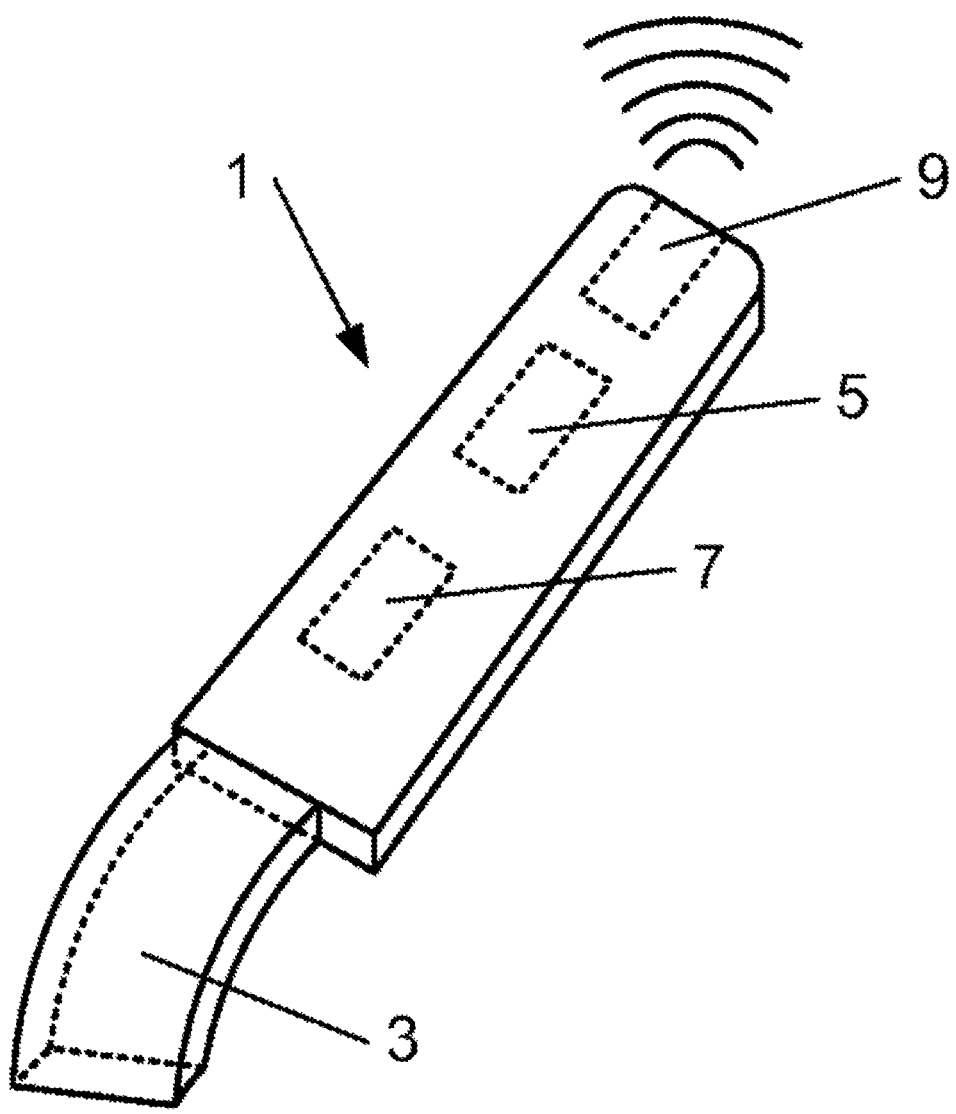
FIG. 1 illustrates a hand-held scanning device.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

The terms "connected component" or "CC" as used herein refer to a set of components (e.g. black or white pixels) that fulfils the following two conditions. The first condition is that each component of the connected component has the same value (e.g. black or white). The second condition is that each component of the connected component is connected to each of the component of the connected component by a path made of components which belong to the connected component. The connected component is not included in a larger set of components that fulfils the first and second conditions, i.e. is not included in a larger connected component. The description of a connected component may include a list of triplets whereby there is one triplet per column.

FIG. 1 illustrates a hand-held scanning device 1. The hand-held scanning device has an optical sensor 3 for acquiring an image when the hand-held scanning device is moved over a printed text to be scanned or acquired. This results in relative movement between the optical sensor 3 and the image being scanned or acquired. Alternatively, relative movement between the optical sensor and the the printed text may be provided by moving the printed text with respect to the optical sensor. The hand-held scanning device 1 may have a processor 5 and an associated storage element 7. A program stored on the storage element 7 may be executed by the processor 5. The hand-held scanning device 1 may further have a wireless communication module 9. By having a wireless communication module, the hand-held scanning device can wirelessly send to and receive data from any electronic device which is able to communicate via the wireless communication module 9. For example, the hand-held scanning device 1 may be wirelessly connected to a tablet, smartphone, portable computer, personal computer, etc.

Figure 2A:
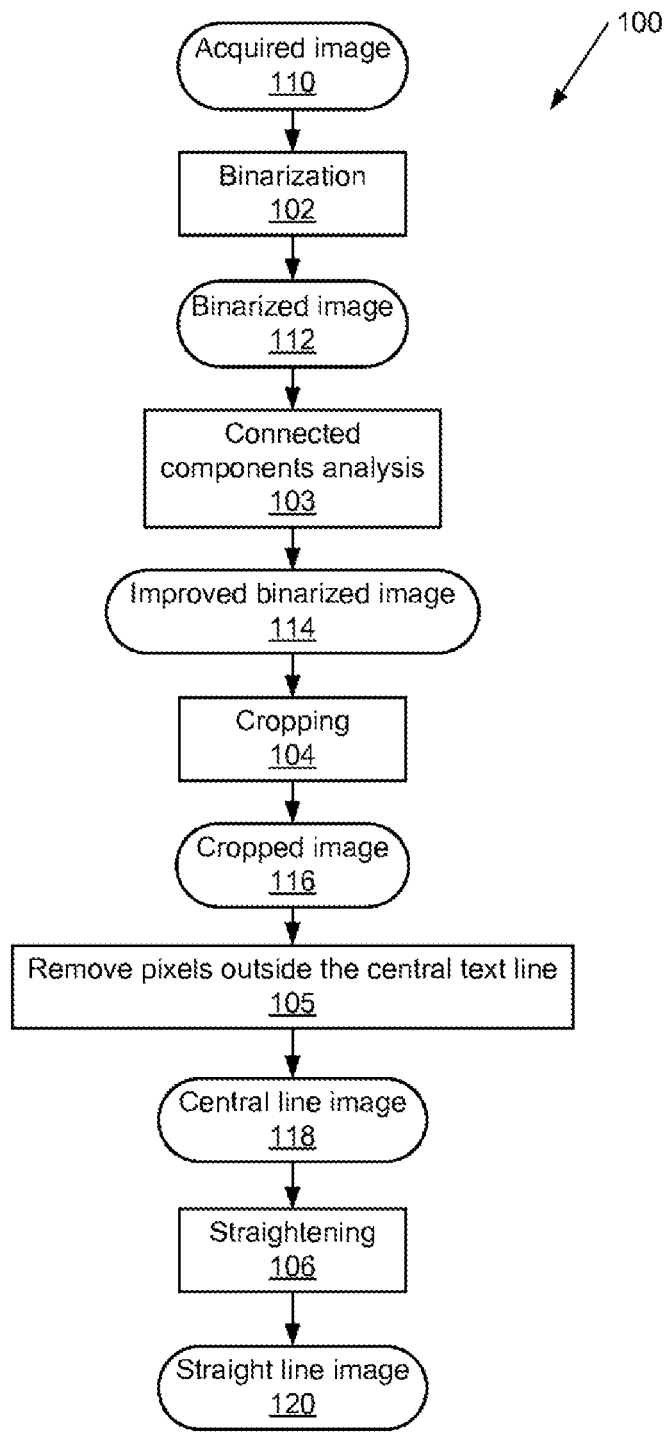
FIG. 2a illustrates a process flow for correcting an image acquired by the device of FIG. 1.

FIG. 2a illustrates a process flow 100 for correction of an image acquired by a hand-held scanning device 1. When a hand-held scanning device 1 moves over a printed text with multiple lines of text, symbols and images, the optical sensor 3 not only acquires the desired text line, hereinafter referred to as a central text line, but also parts of one or both neighbouring text lines. The acquired image 110 may be grayscale or colour. This acquired image 110 is the input for the process flow 100.

At step 102, image binarization is performed to create a binarized image 112. Image binarization may include converting pixel values of the acquired image 110 to either logical one (1) or logical zero (0). These values may be represented by a single bit or by more than one bit, for example, as 8-bit unsigned integers. The pixels of the acquired image 110 may be, grayscale pixels, colour pixels or pixels represented in any other suitable form. The pixel values may be represented by respectively black colour (logical 1) or white colour (logical 0).

In one embodiment, binarization may be performed using any known technique that may broadly be classified into global approaches, region-based approaches, local approaches, hybrid approaches, or any variations thereof. In one example implementation, the image binarization is performed using Sauvola binarization. In this technique, binarization is performed on the basis of small image patches. Upon analysing statistics of the local image patch, a binarization threshold is determined using the following formula:

$$T_{th} = m * \left[1 + k\left(\frac{s}{R} - 1\right)\right] \quad [1]$$

where, m and s are local mean and standard deviation, respectively, R is the maximum value of the standard deviation; and k is the parameter controlling the threshold value. The parameter k may be chosen depending upon the document image. In one embodiment, k may be set manually. In another embodiment, the parameter k may be set automatically depending upon text characteristics of the document image.

At step 103, further image pre-processing may be performed on the binarized image 112. The further image pre-processing may require the erasure of very long and thin horizontal black connected components. The further image pre-processing may also include despeckling, which is the erasure of small dots. The result of this step 103 is an improved binarized image 114.

At step 104, the binarized image 112 (or the improved binarized image 114 if available) may be cropped to remove left and right white columns (if any). The result is a cropped image 116.

At step 105, any black pixels outside the central text line may be removed from the cropped image 116. The determination of the central text line to create as output a central text line image 118 is described in more detail below.

At step 106, the central text line in the central text line image 118 is corrected to a straight line of characters. The creation of a straight line image 120 from a wavy line is described in more detail below.

Figure 3:
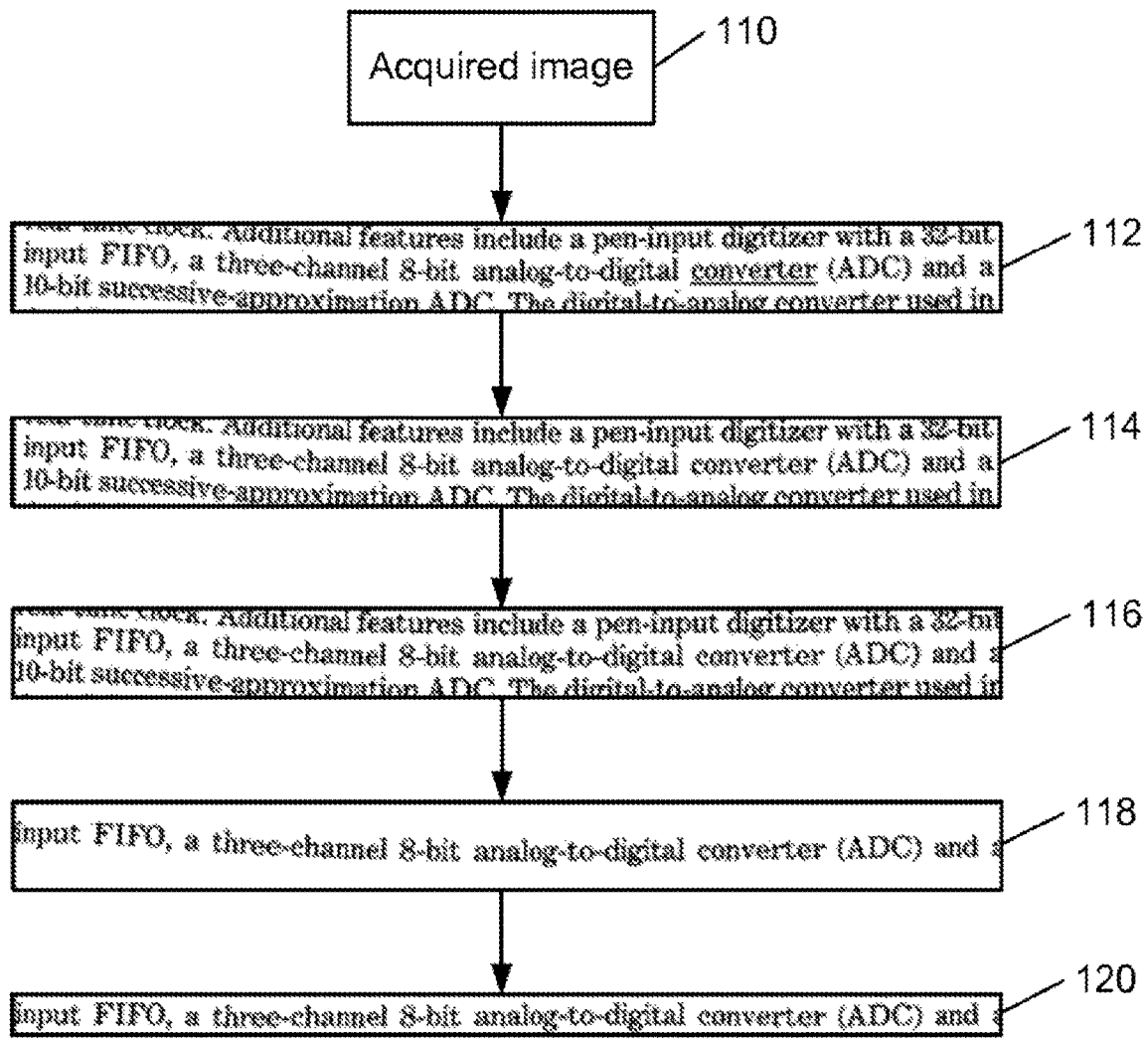
FIG. 3 illustrates an example of the process flow to provide an output image.

Referring now to FIG. 3, an example for the process flow 100 described above with respect to FIG. 2a is shown. Acquired image 110 is binarized to binarized image 112. Binarized image 112 is optionally improved by removing long horizontal black connected components which results in the improved binarized image 114. The improved binarized image 114 is subsequently cropped to become the cropped image 116. From the cropped image 116, the black components or pixels outside the central text line are removed or replaced by white components to form the central text line image 118. For the central text line image 118, the central text line is straightened to become a straightened central text line and the straightened central text line image 120 is formed.

Figure 2B:
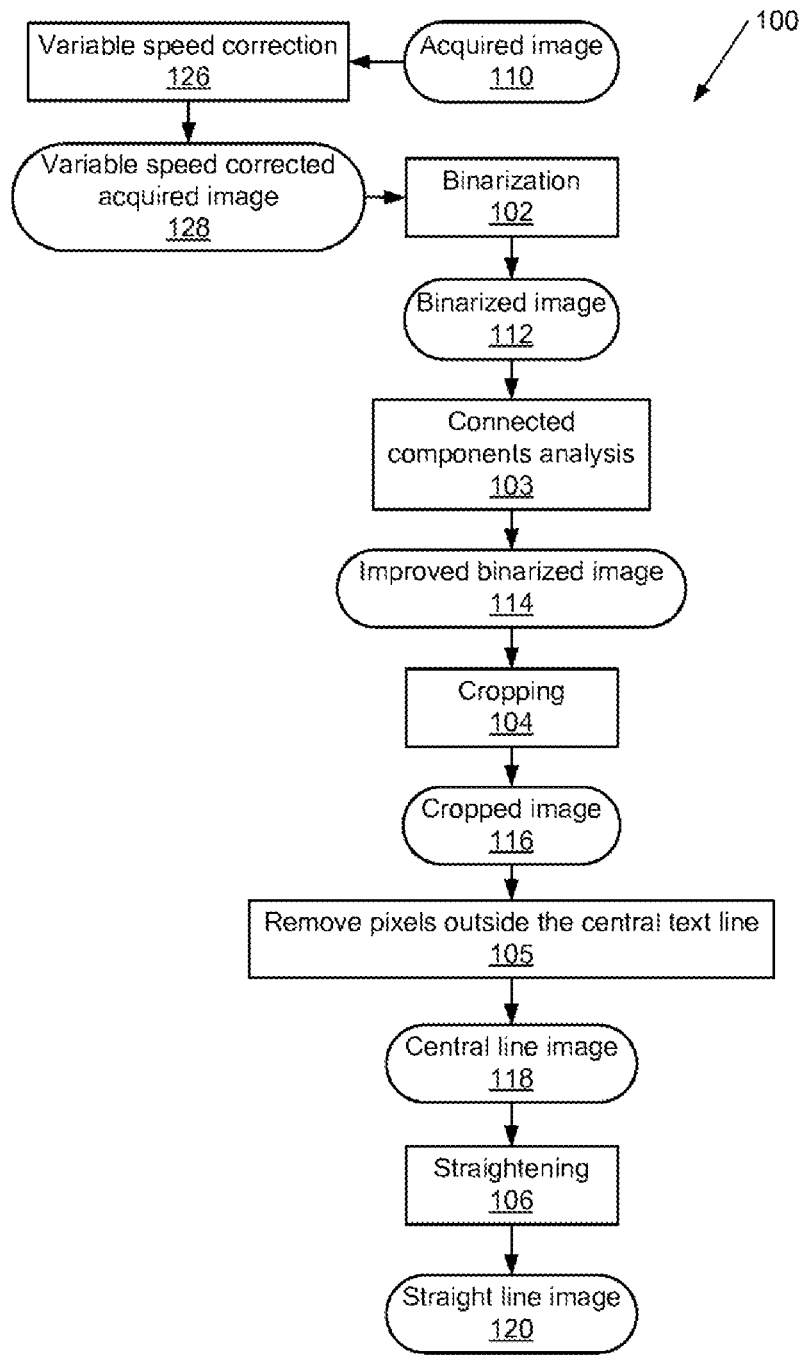
FIG. 2b illustrates the process flow of FIG. 2a combined with variable speed correction before binarization.
Figure 2C:
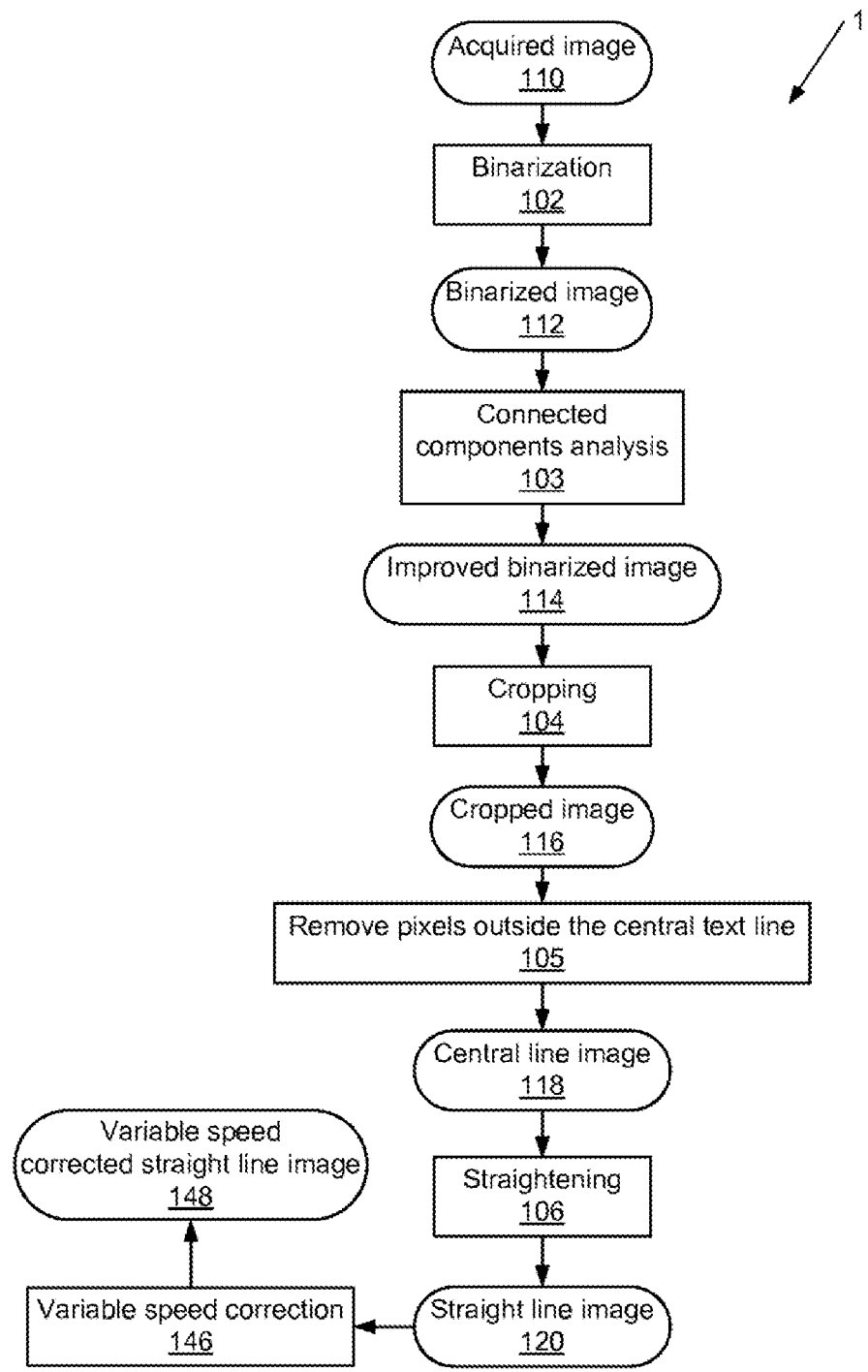
FIG. 2c illustrates the process flow of FIG. 2a combined with variable speed correction at the end of the correction process.

Process flow 100 (FIG. 2a) may have a step to correct distortion arising from the variable instantaneous speed of the hand-held scanning device with respect to the image being scanned or acquired. The variable speed correction 126 can be done at the beginning of the process flow of FIG. 2a, i.e. before binarization. This is illustrated in FIG. 2b. The output is a variable speed corrected acquired image 128 which is now the input for the binarization at step 102. Alternatively, the variable speed correction 146 can be performed at the end of the process flow of FIG. 2a, i.e. after the straight line image is created and thus with the straight line image as input for the correction of the speed correction step. The output is a variable speed corrected straight line image 148. This is illustrated in FIG. 2c. Correction of distortions coming from variable instantaneous speed are known in the art and all known variable speed correction methods can be combined with the present invention. Depending on the type of handheld scanning device, the correction of instantaneous scanning speed is made before binarization (see FIG. 2b) or as a last image pre-processing step (see FIG. 2c).

Testing learned that combining the correction as described in 2A with the instantaneous speed correction described in U.S. Pat. No. 6,965,703 wherein the instantaneous speed correction is executed at the end as illustrated in FIG. 2c provides a resulting image which delivers very accurate results in further character recognition processes. For a description of the speed correction method of U.S. Pat. No. 6,965,703, we refer to published document U.S. Pat. No. 6,965,703 of which we integrate the content by reference.

Figure 4:
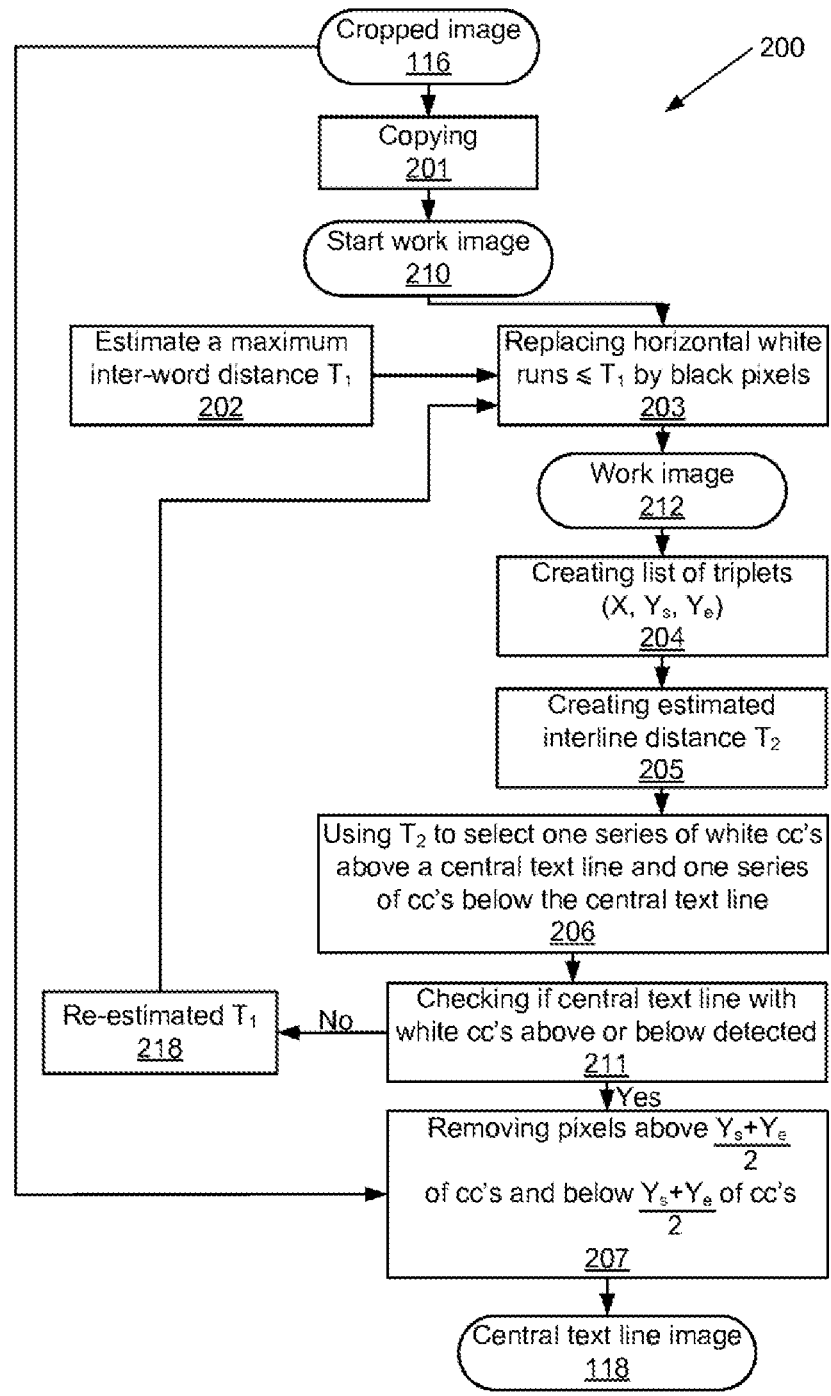
FIG. 4 illustrates a process flow for removing pixels outside a central text line.

FIG. 4 illustrates a process flow 200 corresponding to step 105 in process flow 100. In this process flow, black pixels (or any other type of predetermined components in the binarized image) outside the central line are removed.

At step 201, a start work image 210 may be created by copying the cropped image.

At step 202, a maximum inter-word distance T1 is estimated in the binarized image. This is discussed in more detail below.

At step 203, any horizontal white runs smaller or equal to the maximum inter-word distance T1 in the start work image 210 are set to black. The result of step 203 is a work image 212.

At step 204, the work image 212 is used to build a list of white connected components, each white connected component being described by a list of triplets (X, Ys, Ye) wherein X indicates the column X, Ys the start of the connected component in column X and Ye the end of the connected component in column X. The triplets (X, Ys, Ye) of each connected component are subsequently stored in a global list for all triplets of all CCs in the work image 212, the triplets being ordered from left to right and from top to bottom.

At step 205, an inter-line distance T2 is estimated by using the global list of triplets created in previous step.

At step 206, the estimated inter-line distance T2 is used to select one series of white connected components above a central text line and one series of white connected components below the central text line. This will be described in more detail below.

After step 206, at step 211, the system may check if a series of white connected components above and a series of white connected components below a central text line are detected. If this condition is not met ("no"), the maximum inter-word distance T1 is re-estimated in step 218, e.g. a larger maximum inter-word distance T1 value can be taken. If this condition is met ("yes"), the process flow moves to step 207.

At step 207, for each column corresponding to each triplet of the series of white connected components above the determined central line, black pixels above (Ys+Ye)/2 are changed to white, and for each column corresponding to each triplet of the series of white connected components below the determined line, black pixels below (Ys+Ye)/2 are changed to white. The resulting image is an image with only the determined central line in black pixels, called the central text line image 118.

Figure 5:
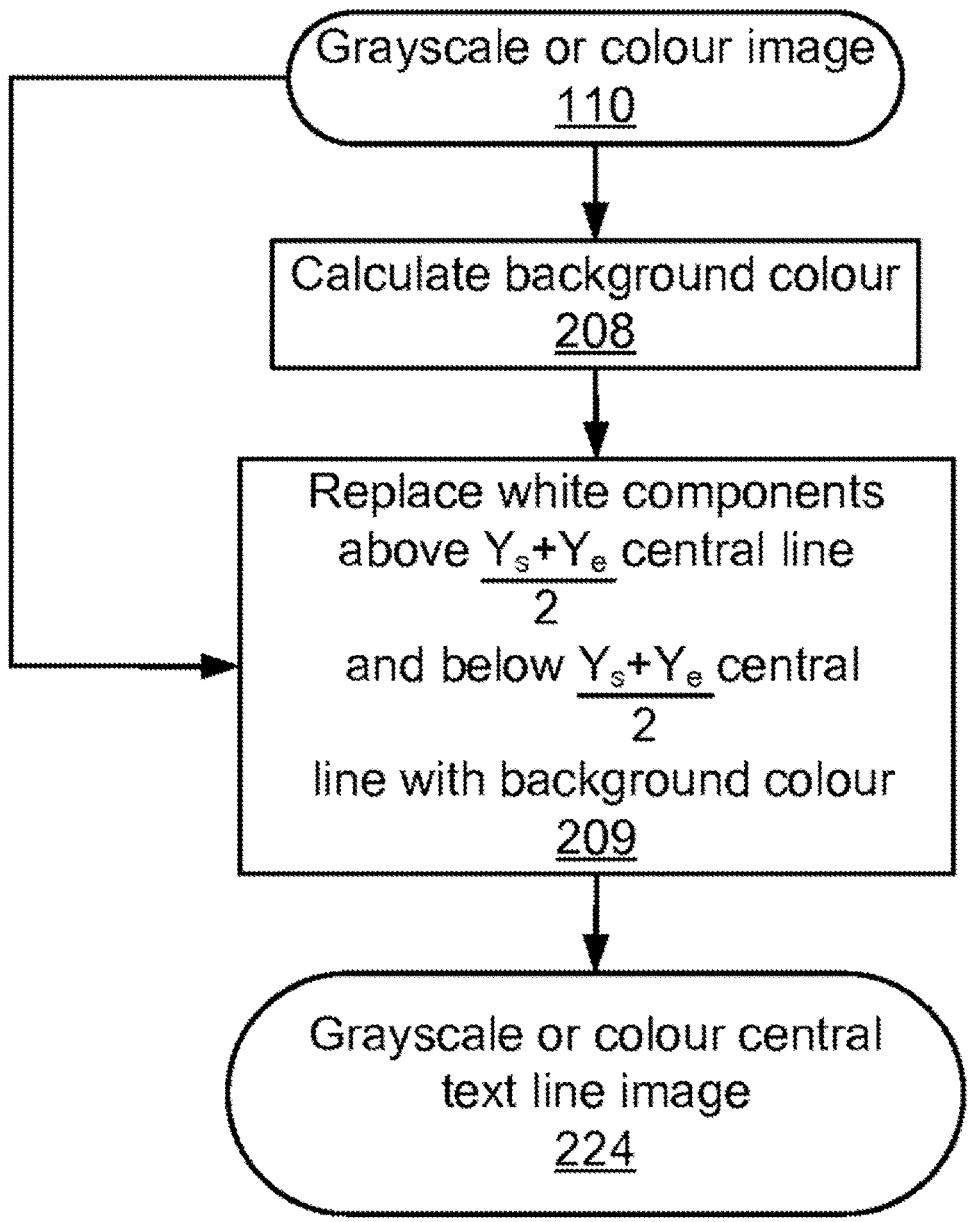
FIG. 5 illustrates a process flow for adjusting for background colour.

Optionally, the system may include steps 208 and 209 as illustrated in FIG. 5.

At step 208, a background colour is calculated by determining, in the scanned or acquired image 110, the components corresponding to white components in the binarized image 112. The calculated background colour is, for example, the average of all components in the acquired image 110 corresponding to white components in the binarized image 112.

At step 209, the components in the acquired image 110 above the determined central line and above (Ys+Ye)/2 are replaced by the calculated background colour of step 208, and the components in the acquired image 110 below the determined central line and below (Ys+Ye)/2 are replaced by the calculated background colour. The result is a grayscale or colour central text line image 224 on which the central line is isolated. By doing so, the grayscale or colour central text line image 224 can be used to correct the straightness of the central text line. If, however, step 208 and step 209 are not performed, the straightness of the central line is corrected on the (binarized) central text line image 118 (as described above with reference to FIG. 2a).

Figure 6:
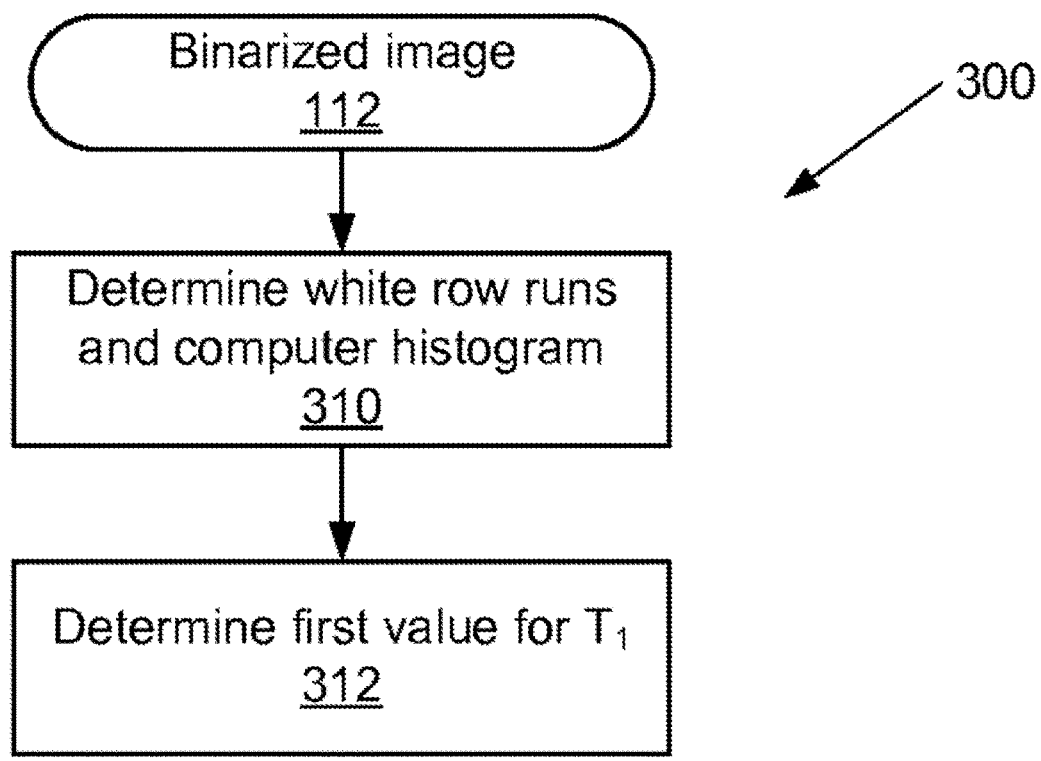
FIG. 6 illustrates a process flow for determining maximum inter-word distance.

FIG. 6 illustrates a process flow 300 to determine a first estimated value for the maximum inter-word distance T1 used in step 202 of process flow 200. At step 310, in the cropped image 116, all white row runs are determined and a histogram of their lengths is calculated.

At step 312, the histogram is used to determine a first estimate for the maximum inter-word distance T1 for use in step 202 of process flow 200 (FIG. 4).

Figure 7:
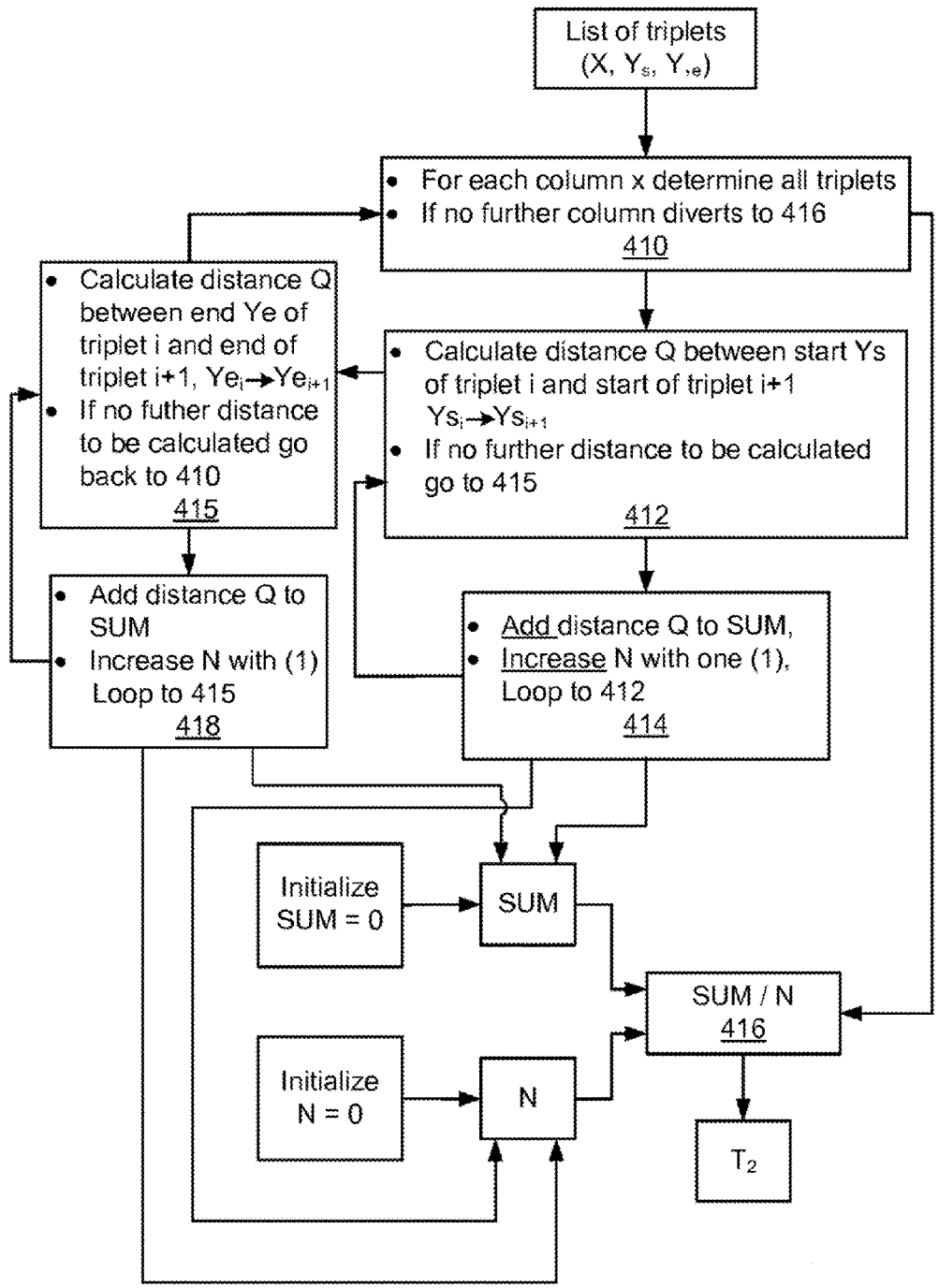
FIG. 7 illustrates a process flow for estimating an inter-line distance.

Referring to FIG. 7, a process flow 400 is illustrated which corresponds to step 205 in process flow 200 (FIG. 4). In this process flow 400, a first value for the inter-line distance T2 is determined. As described above, at step 204 a list of triplets, ordered from left to right and top to bottom, is created. For each column, at step 410, the triplets of the column are determined in the list. These are the triplets with the same value for X. If no other columns exist, the process flow moves to step 416 as will be described in more detail below.

At step 412, for each column X, the distance Q is determined between subsequent starts of triplets Ysi and Ysi+1.

At step 414, for each determined distance Q, this distance Q is added to the SUM parameter and the increment parameter N is increased by 1. After increasing the N parameter there is a loop back to step 412. At 412 if no further distances between subsequent starts of triplets are to be calculated, the process flow moves to step 415 and the distance Q between subsequent ends of triplets Yei and Yei+1 is determined. At step 418, for each determined distance Q, this distance is also added to the SUM parameter and the increment parameter N is increased by 1. Step 418 ends by looping back to step 415. At 415, if no further distances Q between subsequent ends of triplets are to be calculated, the process flow moves back to step 410 and a subsequent column X+1 will be processed. If no further column, the process flow moves to step 416.

At step 416, the SUM parameter is divided by the increment parameter N. The resulting value is a first estimate for the inter-line distance T2.

Figure 8A:
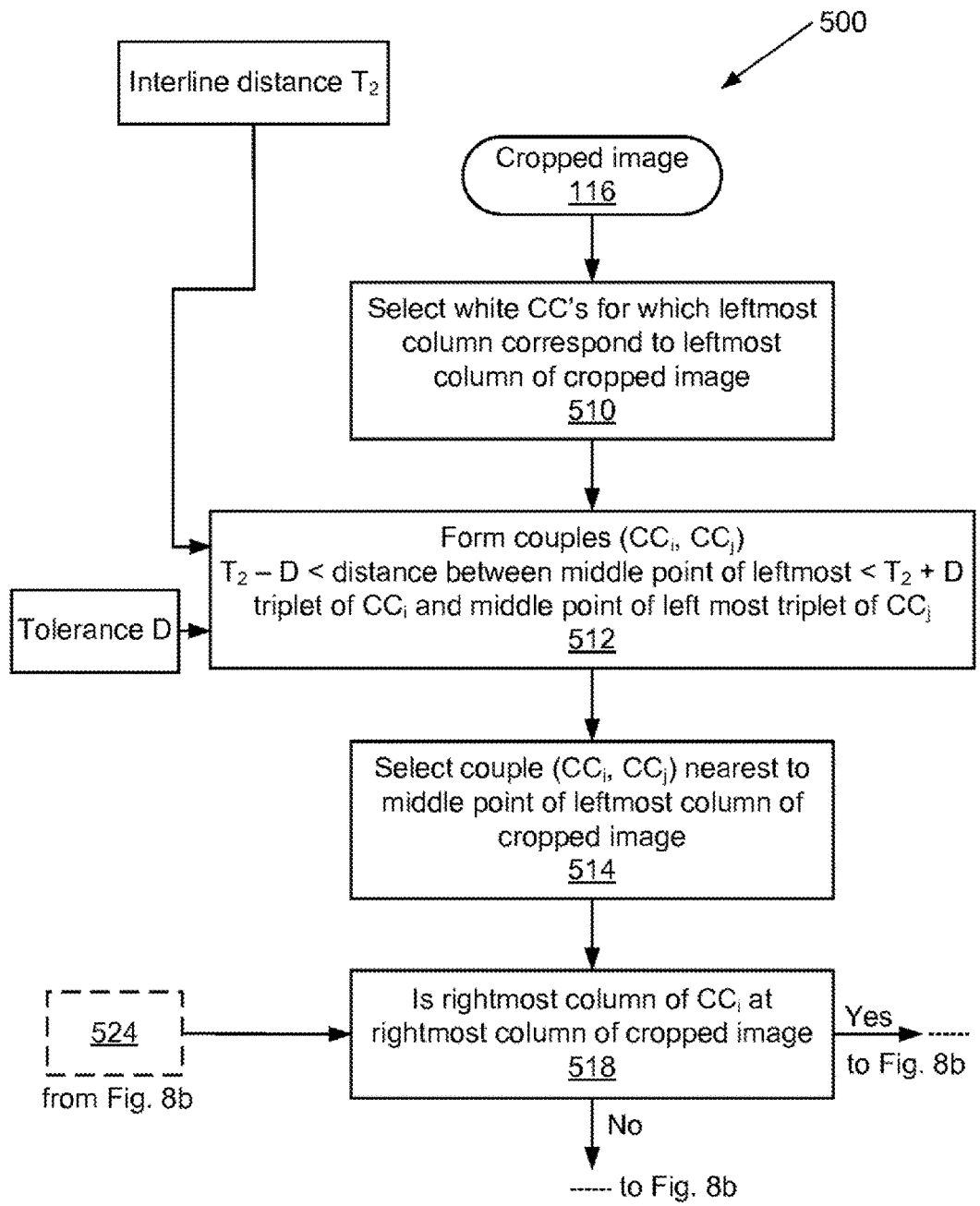
FIGS. 8a and 8b together illustrate a process flow for determining a central text line.
Figure 8B:
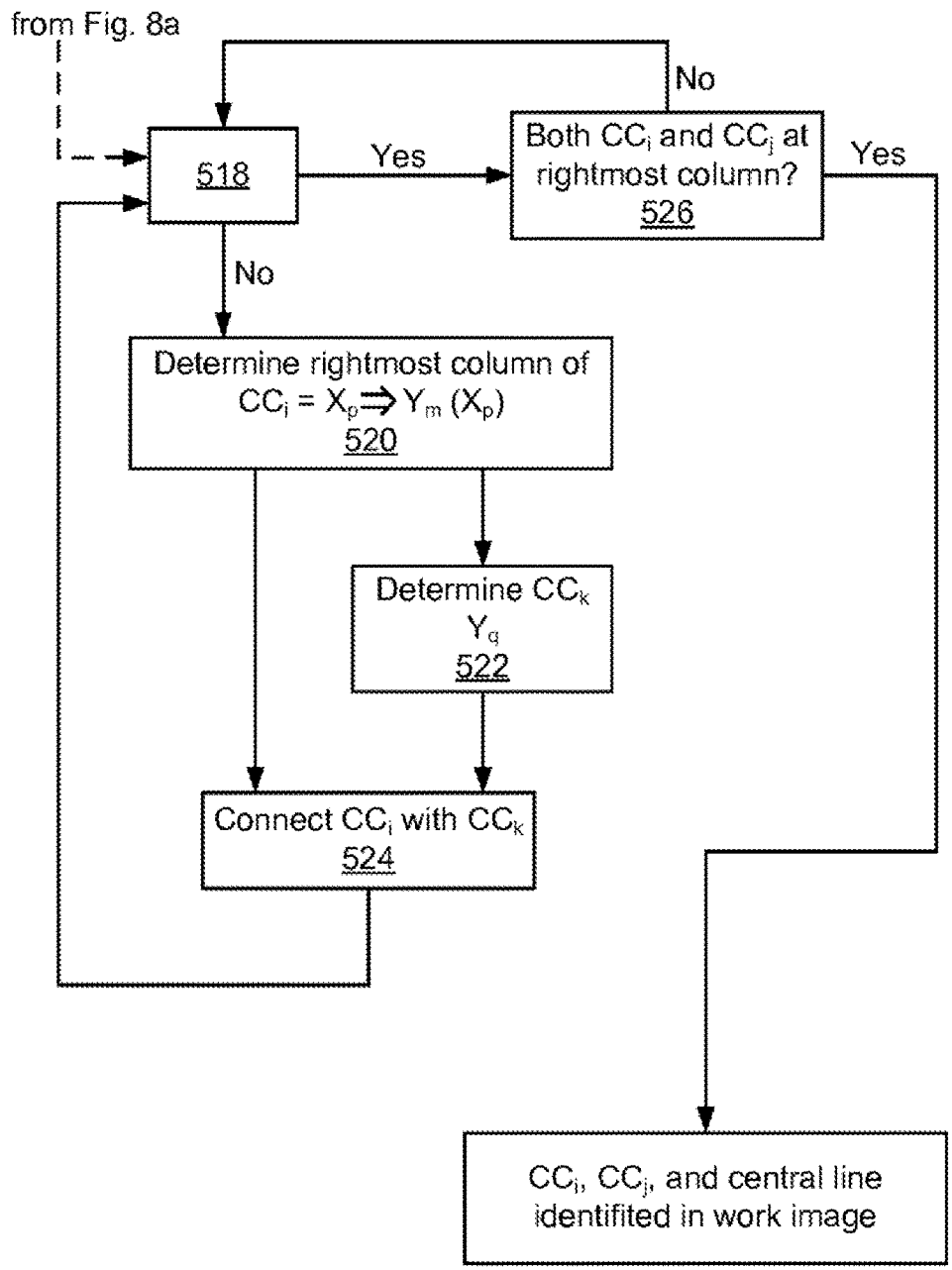

FIGS. 8a and 8b illustrate a process flow 500 corresponding to step 206 in process flow 200 (FIG. 4). In this process flow, the estimated inter-line distance T2 is used to determine two series of white connected components and a central line, in which one series of white connected components is above and one series of white connected components is below the determined central text line.

At step 510, white connected components CCn are selected for which the left side corresponds to the left side of the cropped binarized image.

At step 512, from the selection of white connected components CCn, couples [CCi, CCj] are formed where the couples fulfil the following conditions:
CCi is above CCj; and
the distance between the middle point of leftmost triplet of CCj and the middle point of the leftmost triplet of CCi is between (T2−D) and (T2+D) where D is a tolerance factor and T2 the estimated inter-line distance from step 205 (FIG. 4).

Figure 9:
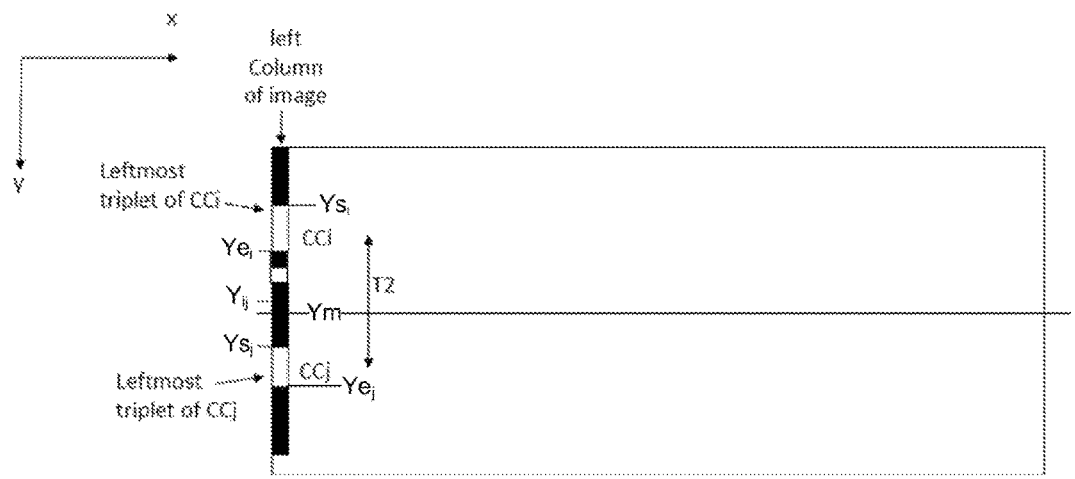
FIG. 9 illustrates a comparison step in the process flow of FIGS. 8a and 8b.

At step 514, for each couple [CCi, CCj] formed at step 512, a middle point Yij is calculated as the middle between the end Yei of the leftmost triplet of CCi and the start Ysj of the leftmost triplet of CCj. This is illustrated in FIG. 9. Further, the middle point Ym of the leftmost column of the cropped image is determined. Subsequently, the couple [CCi, CCj] is selected for which Yij is nearest to Ym: selected couple [CCi, CCj].

At step 518, it is verified if the rightmost column of the CCi is at the rightmost column of the cropped image. The outcome of step 518 can be yes or no as illustrated at the beginning of FIG. 8b.

If the outcome of step 518 is no, at step 520, the column position of the rightmost column of the CCi in the cropped image is determined. This column is indicated column Xp in FIG. 10. Further, the middle point Ym(Xp) of the triplet of CCi for column Xp is determined.

At step 522, the system identifies white connected components CCk for which the leftmost triplet overlaps a row of components through the middle point Ym(Xp). If more than one is found, connected components CCk for which the leftmost triplet is at a column Xq closest to column Xp is selected. Xq and CCk are illustrated on FIG. 10.

Figure 10:
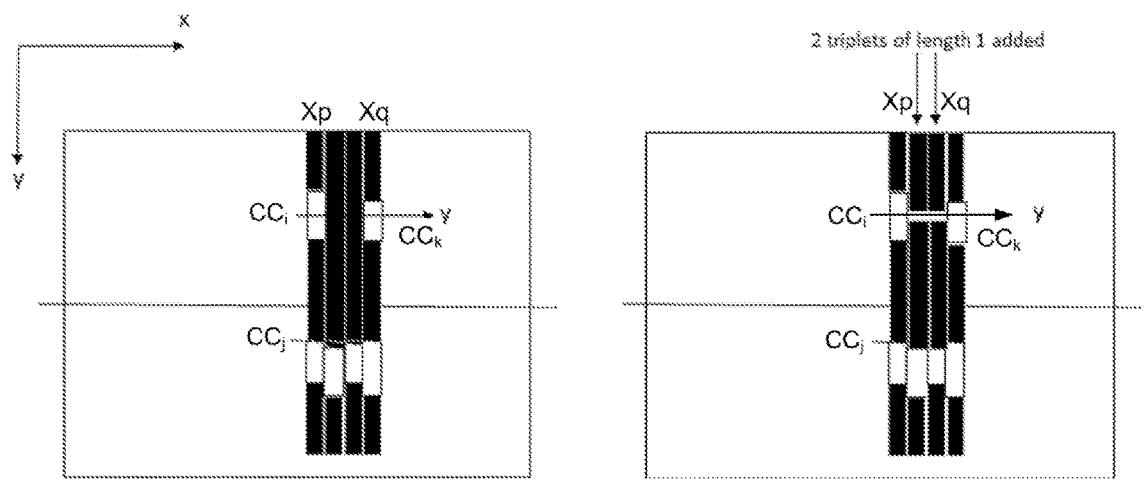
FIG. 10 illustrates the connection of two connected components in a series of connected components in the process flow of FIGS. 8a and 8b.

At step 524, the white connected components CCi and CCk are connected by adding to CCi triplets of length one from Xp+1 to Xq-1. This corresponds with triplets (Xp+1, Ym, Ym+1) up to (Xq-1, Ym, Ym-1). This is illustrated in FIG. 10. By adding these triplets of length one, CCi is also enlarged by the triplets of CCk. If no CCk is found, CCi is enlarged by adding triplets (Xp+1, Ym, Ym+1) up to (Xr, Ym, Ym+1) with r being the rightmost column of the cropped image.

After step 524, it's verified again at 518 if the rightmost triplet of the (enlarged) CCi is at the rightmost column of the cropped image.

If no, the system is again at step 520 for the connected components CCi.

If yes, the system is repeating the steps 518 to 524 for the second connected component CCj of the selected couple [CCi, CCj]. This can for example be done by verifying if both connected components CCi and CCj of the selected couple have the rightmost triplet at the rightmost column of the cropped image as illustrated at step 526 in FIG. 8b. If at step 526 the answer is no, then step 518 is started for CCj. At step 518 it's verified if the rightmost triplet of CCj is at the rightmost column of the cropped image and steps 520 to 524 are executed for CCj.

If the outcome of step 526 is yes, then two white connected components CCi and CCj are identified of which one is above and one is below the central line. In other words, process flow 500 identified the central line in the work image.

Figure 11:
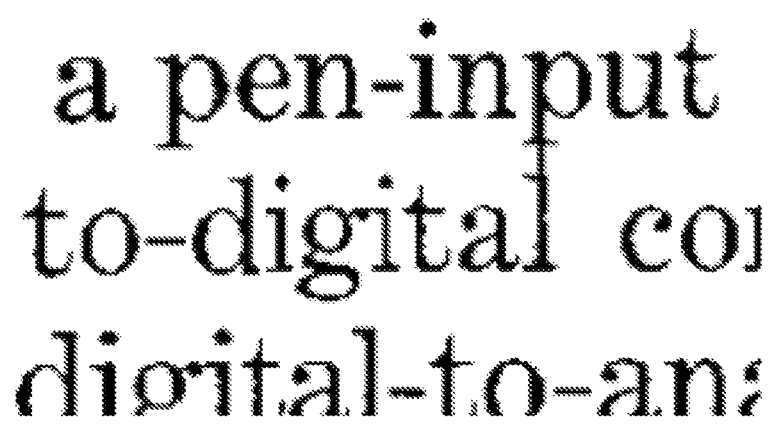

This process flow is especially useful in situations where two subsequent text lines are connected in the acquired image as illustrated in FIG. 11. In Figure 11the acquired image has a connection between the character p and the character 1. The process flow 500 will correct this and improves by that the accuracy of any OCR process on the scanned image.

Comparing the central line in the work image with the cropped binarized image, provides the location of the central line in the cropped binarized image. This results in a cropped image with only a central text line, i.e. the central text line image 118.

Figure 12:
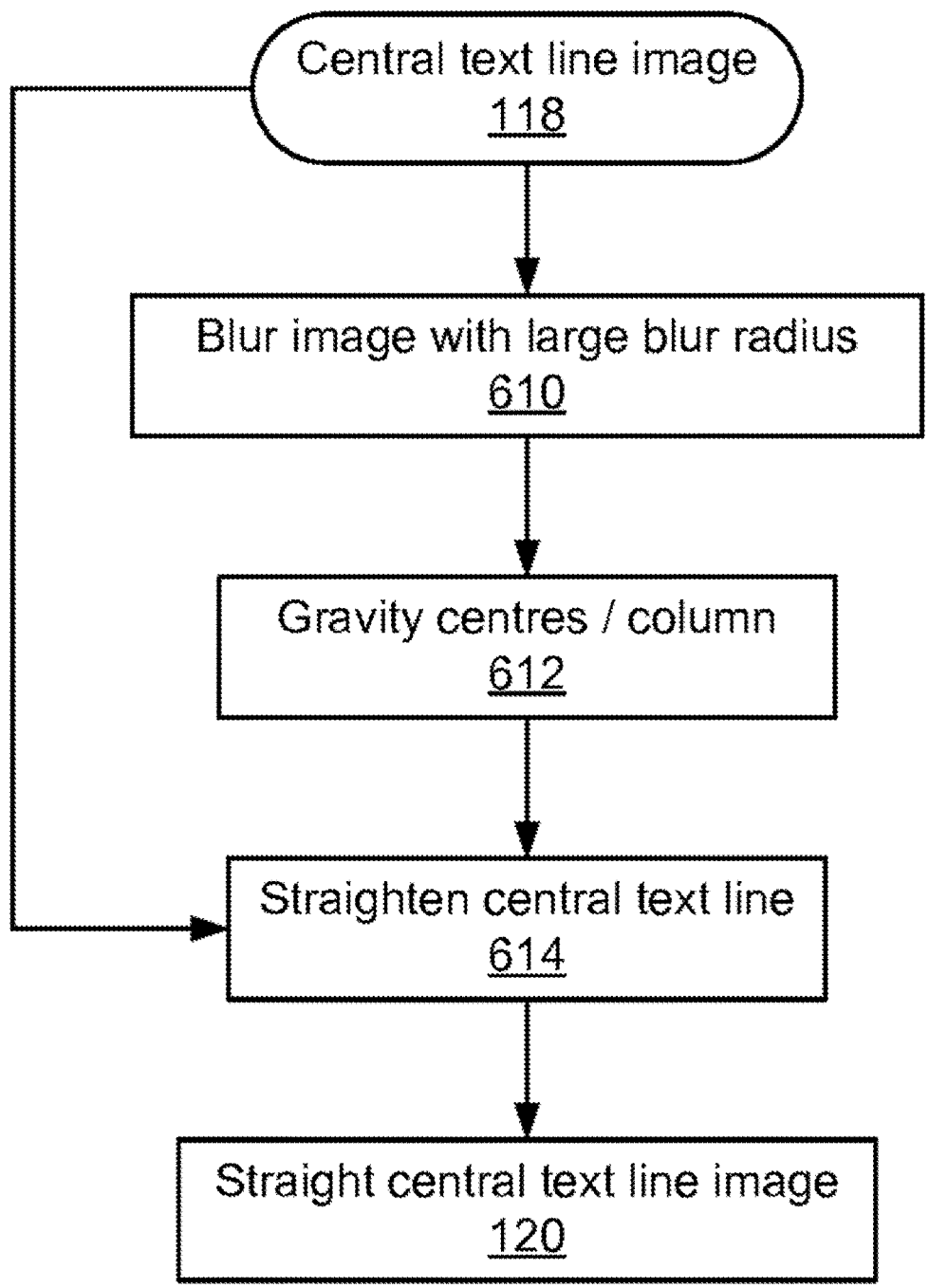
FIG. 12 illustrates a process flow for straightening a central text line.

FIG. 12 illustrates a process flow 600 corresponding to step 106 in process flow 100. Process flow 600 straightens the central text line in the central text line image 118. Alternatively, process flow 600 can be executed on the grayscale or colour central line image 224 as discussed above.

At step 610, the central text line image 118 is blurred with a large blur radius. For a black and white image, the result of blurring is a grayscale image.

At step 612, for each column, the gravity centre of the grey components in each column is determined. Connecting the gravity centres in each subsequent column creates a gravity centre line.

At step 614, the gravity centre line is used to create a straight centre line in the corresponding non-blurred central text line image 118. This can be realized by translating the columns such that the gravity centre line becomes a straight horizontal line.

In an alternative method, the gravity centre line is made straight by translating and rotating each black connected component of the text line. Each black connected component is rotated by an angle corresponding to the angle of the gravity centre line at the gravity centre of the CC middle column with respect to the desired straight horizontal line.

Figure 13:
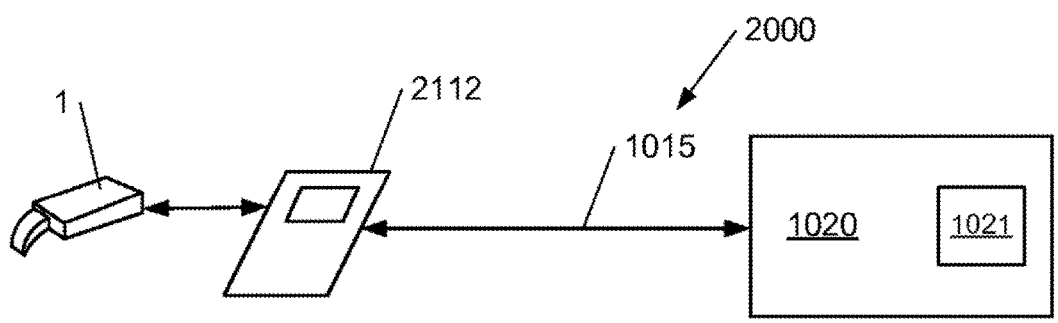
FIG. 13 illustrates an system according to an embodiment of the present invention, the system including a hand-held scanning device, a mobile device and a remote computer.

The handheld scanning device 1 of FIG. 1 can be used in many applications and configurations. FIG. 13 illustrates a system 2000 where the handheld scanning device 1 may be used in connection with a mobile device 2112 and where the mobile device may be connected to a remote computer 1020. The system 2000 comprises the hand-held scanning device 1, a mobile device 2112, a remote computer 1020, a connection between the hand-held scanning device 1 and the mobile device 2112 and a connection 1015 between the mobile device 2112 and the remote computer 1020. The hand-held scanning device 1 is able to scan a text present on a physical support (not shown) like a hardcopy document (e.g. a sheet of paper) or an object.

The hand-held scanning device 1 can be a pen scanner with an optical sensor, and the mobile device 2112 can be a multi-purpose mobile terminal such as a smart-phone or a tablet. The hand-held scanning device 1 and the mobile device 2112 are connected either by a wired or wireless connection.

The connection 1015 between the mobile device 2112 and the remote computer 1020 is preferably at least partially wireless. The connection 1015 is preferably at least partially through a cellular network connection. The connection 1015 may, at least partially, use an internet connection.

The remote computer 1020 can be a dedicated server. The remote computer 1020 may be "in the cloud" and may comprise at least one computer of a cloud computing service, a cloud computing service being a shared pool of configurable computing resources. The remote computer 1020 may also be a computer in the same building as the user of the mobile device 2112. The remote computer 1020 includes a memory 1021.

Figure 14:
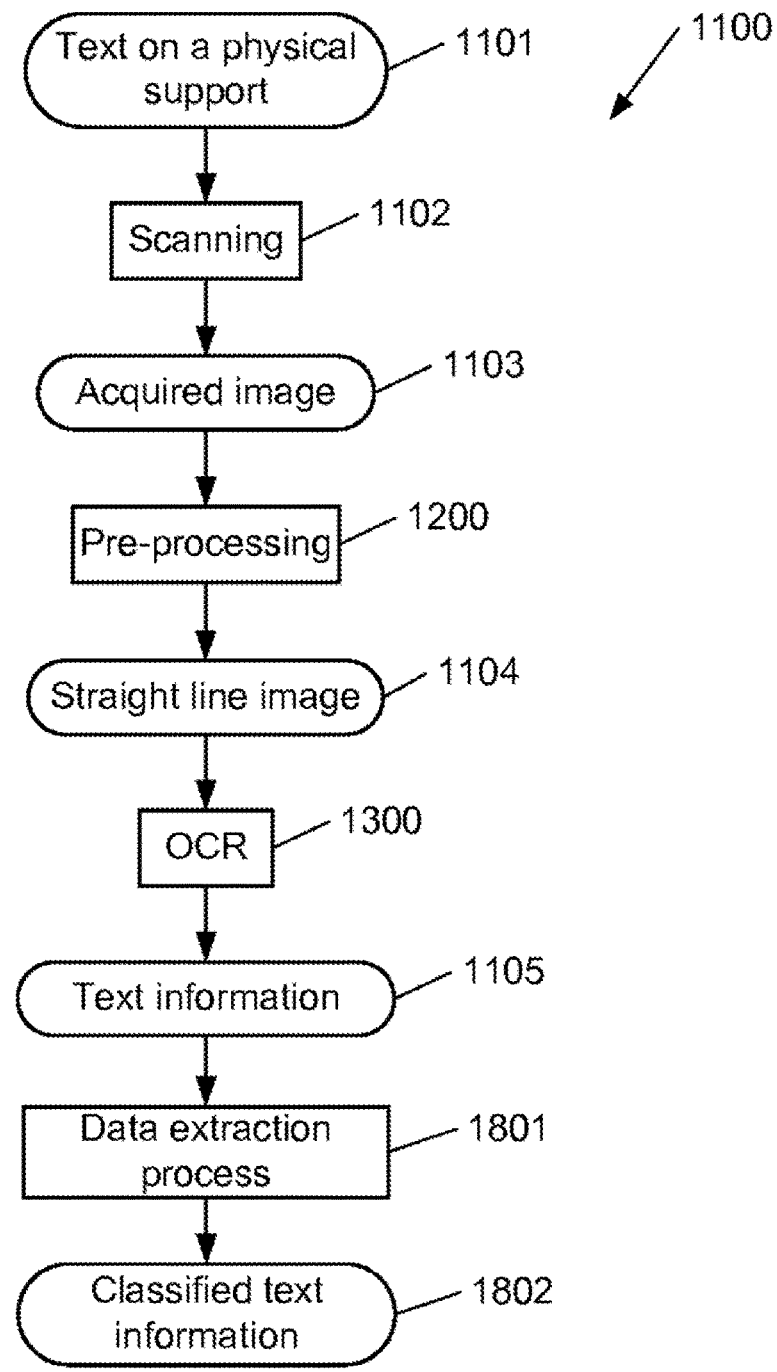
FIG. 14 shows a flowchart of an OCR process flow to obtain text information related to a text on physical support starting from said text, according to an embodiment of the present invention.

FIG. 14 shows a flowchart of a process flow 1100 to obtain text information 1105 and/or classified text information from a text on a physical support 1101. The text on the physical support 1101 is scanned by the hand-held scanning device 1. The scanning step 1102 outputs an acquired image 1103, which is a digital image. The acquired image 1103 may be a black-and-white, grayscale or colour image.

The acquired image 1103 is used as input for image pre-processing 1200 and results in at least one straight line image 1104. The image pre-processing 1200 comprises the above described distortion correction and may include further pre-processing processes. The straight line image 1104 is a black-and-white, grayscale or colour image containing a string of characters, which may comprise a line or a column of characters. The straight line image 1104 is a digital image. The characters in the straight line image 1104 are preferably in a string of characters aligned in a straight line.

The straight line image 1104 is used as input for OCR step 1300. The OCR step 1300 is a process wherein characters are identified according to one of the methods known in the art. The result of the OCR step 1300 is text information 1105. Optionally, the text information 1105 may be used in a data extraction process 1801. In a data extraction process the text information is compared with databases or tables to determine extra information about the text information such that the text information can be classified. The output of the data extraction step 1801 is classified text information 1802.

The text information 1105 preferably includes the ID (identification) of the characters of the straight line image 1104. The ID of a character is a recognition of the character in machine-readable code, in such a way that the text information 1105 includes preferably a searchable string of characters. The text information 1105 may include several possible IDs of the characters of the straight line image 1104, with optionally a probability associated with each of the possible IDs. They provide alternative solutions for the identification of a character or group of characters.

The term "character" as used herein refers to a symbol or sign used in writing like a grapheme, a logogram, an alphabetic letter, a typographical ligature, a numerical digit or a punctuation sign.

In an embodiment of the invention, scanning 1102 is performed by the hand-held scanning device 1 and the pre-processing 1200 and the OCR 1300 are performed by the remote computer 1020. This provides the advantage that no heavy and/or specific data processing has to be performed on the hand-held scanning device 1 nor on the mobile device 2112. This means that the hand-held scanning device 1 and the mobile device 2112 may therefore be inexpensive and light. In such a system, the scanned image is send to the remote computer via the mobile device. If the resulting information is needed in an application running on the mobile device, the remote computer send the result of the process back to the mobile device after pre-processing and character identification.

In another embodiment of the invention, scanning 1102 is performed by the hand-held scanning device 1, the pre-processing 1200 is performed by the mobile device 2112 and the OCR 1300 is performed by the remote computer 1020. As the OCR 1300 is the part of the process flow 1100 which requires the most computing power and memory resources, and sometimes the use of one or more databases, it may be advantageous to perform the OCR on a powerful device, such as for example in the cloud using a cloud processing service. It is possible that the mobile device 2112 connects to the memory 1021 of the remote computer 1020 to obtain data while performing the OCR 1300.

In another embodiment of the invention, scanning 1102 and pre-processing 1200 are performed by the hand-held scanning device 1 and the OCR 1300 is performed by the remote computer 1020.

In an embodiment of the invention, a user can choose which steps of the process flow 1100 are to be performed by the mobile device 2112 and which steps are to be performed by the remote computer 1020. The user may indicate his choice before the scanning step 1102, between the scanning step 1102 and the image pre-processing step 1200, or between the pre-processing step 1200 and the OCR step 1300. This choice may be communicated by the user to the system 2000 by an actuator, such as an icon, a switch or a button on the mobile device 2112 or on the hand-held scanning device 1. For example, if the user knows the language of the text to be identified, dependent on the language the user may know if the OCR can be performed with the less powerful character recognition process running on the mobile device or if the OCR could be better performed with the more powerful character recognition process running on the remote computer. In another example, the user may know if the type of characters to be scanned can be recognized by the less powerful OCR installed on the mobile device 2112 or if a more powerful OCR installed on the remote computer is needed. The user can in this examples take the decision to perform the OCR step on the mobile device or on the remote computer 1020.

In another embodiment, an application is implemented and running on the mobile device which is in charge of the processing of the application. The user selects on the mobile device the language of the text to recognize in this application. Based on this language selection, the application goes through a process flow and decides which steps are performed on the mobile device and which steps are performed on the remote computer. The application communicates with the remote computer where needed.

In some embodiments of the invention a data extraction process 1801 is performed on the text information. Independent on which device has performed the pre-processing 1200 and the OCR 1300, the data extraction process 1801 is preferably performed by the remote computer 1020 because it requires one or more significant databases and significant computing resources. The data extraction process 1801 may be performed by an intelligent data recognition (IDR) software known in the art running on the remote computer 1020. This IDR software may be used for example to enter the data of an invoice into an ERP (Enterprise Resource Planning) system.

In a preferred embodiment of the invention, if the text information 1105 is identified on the remote computer 1020, the remote computer 1020 is sending the identified text information to the mobile device 2112 and the mobile device 2112 may display the text information on a display of the mobile device 2112.

Similarly, when a data extraction process 1801 is performed on the remote computer 1020, the classified text information 1802 may be sent by the remote computer 1020 to the mobile device 2112 and the mobile device 2112 may display the classified text information on the display of the mobile device 2112.

Figure 15:
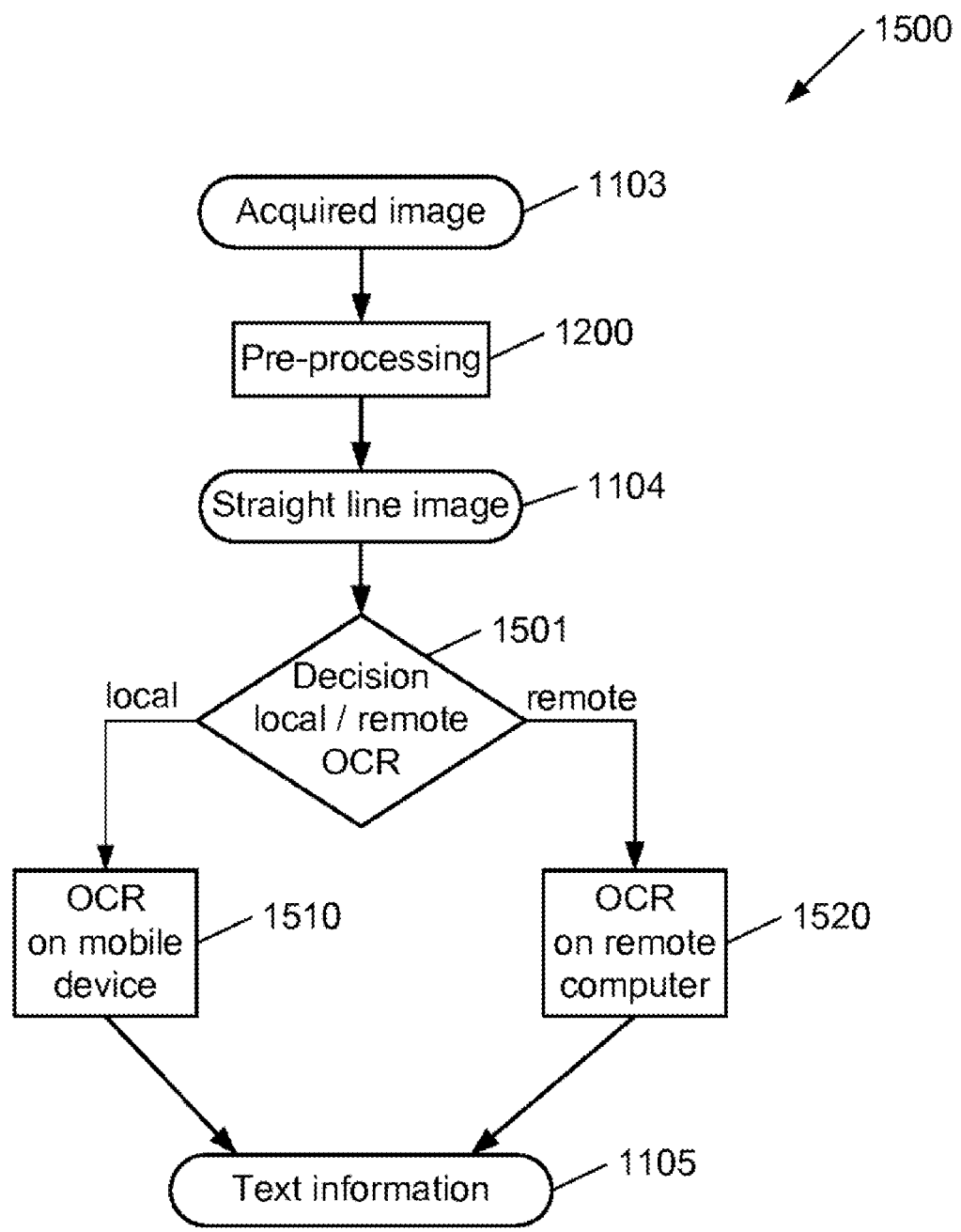
FIG. 15 shows a flowchart of an OCR process flow involving a decision step between local or remote OCR, according to an embodiment of the present invention.

FIG. 15 illustrates a process flow 1500 involving a decision step between performing OCR on the mobile device or performing OCR on the remote computer, according to an embodiment of the invention. In this embodiment, the mobile device 2112 has sufficient memory and processing power to run an OCR process which is requiring not a too large amount of processing power.

Based on the straight line image 1104 obtained after the pre-processing 1200, or based on a choice of the user, a decision 1501 is taken to perform the OCR of the straight line image 1104 locally on the mobile device 2112 (step 1510), or remotely on the remote computer 1020 (step 1520). The decision 1501 to OCR locally or remotely may depend on predetermined situations such that in a first predetermined situation, a first OCR 1510, running on the mobile device 2112, is performing the OCR step, while in a second predetermined situation, a second OCR 1520, on the remote computer 1020, is performing the OCR step. Independent on where the OCR is performed, the result of process flow 1500 is the text information 1105 as illustrated in FIG. 15.

The decision 1501 to perform local or remote OCR may be taken by the user of the mobile device 2112. The user may base his decision on the knowledge of the language to be identified, on the desire for accuracy, or on the type of document.

Alternatively, the decision 1501 to perform local or remote OCR may be automatically taken by the mobile device 2112. The mobile device 1501 may check for the existence of the connection 1015 (FIG. 13), and, if there is no connection 1015, the OCR may be performed by the mobile device 2112 if the mobile device 2112 is able to perform it. If there is a connection 1015, the mobile device may decide to perform the OCR on the remote computer.

In a preferred embodiment, the decision 1501 to perform local or remote OCR may take into account the language of the text to recognize, whereby said language may be set by the user on the mobile device 2112. For example, the user can select in an application running on the mobile device the language of the text. Based on that, the application determines if the OCR is performed on the mobile device or on the remote computer.

In a further preferred embodiment, the decision 1501 to perform local or remote OCR may involve an attempt of recognition of a type of character by the mobile device 2112. For example, the mobile device 2112 may have the software required to recognize some character types in a first character type set and to perform OCR for some character types in a second character type set, the first and second character type sets not necessarily being the same. If the mobile device 2112 does not recognize in the straight line image 1104 a character type, Latin character, for example, for which it is able to perform OCR, it sends the straight line image 104 to the remote computer 1020 so that the OCR 1520 is performed thereat, and, if the mobile device 2112 recognizes in the straight line image 1104 a character type for which it is able to perform OCR, it performs the OCR.

Alternatively, the decision 1501 to perform local or remote OCR may be based on a trade-off between speed and accuracy. If the user has indicated that the focus is on a high accuracy of the OCR, the decision 501 will be that the OCR is performed on the remote computer 1520, and if the user has indicated that the focus is on a high speed of the OCR, the decision 1501 will be that the OCR is performed on the mobile device 1510.

OCR on mobile device 1510 and OCR on remote computer 1520 may be different, with OCR on the mobile device 1510 being developed for limited processing and memory resources of the mobile device 1510, and OCR on remote computer 1520 being developed for high accuracy which requires more processing resources.

It is also possible that a decision to perform local/remote process is taken before pre-processing 1200, possibly based on the acquired image 1103. In this case, the pre-processing 1200 and OCR 1300 are both performed either on the mobile device 2112 or on the remote computer 1020.

The decision 1501 process opens many opportunities to optimize the scanning and OCR process. For example, if a user has to scan and recognize alternately pieces of texts in Arabic numbers and pieces of texts in Asian characters, the OCR for Arabic numbers can be installed and performed on the mobile device 1510, because OCR of Arabic numbers can be performed by a less memory and computing resources requiring OCR process, while the OCR for Asian characters can be performed by an OCR process on the remote computer 1020, because OCR processes for Asian characters typically require much more resources and memory. If the user wants to switch between local and remote OCR, it is also possible, with the option that this decision is taken automatically.

Figure 16:
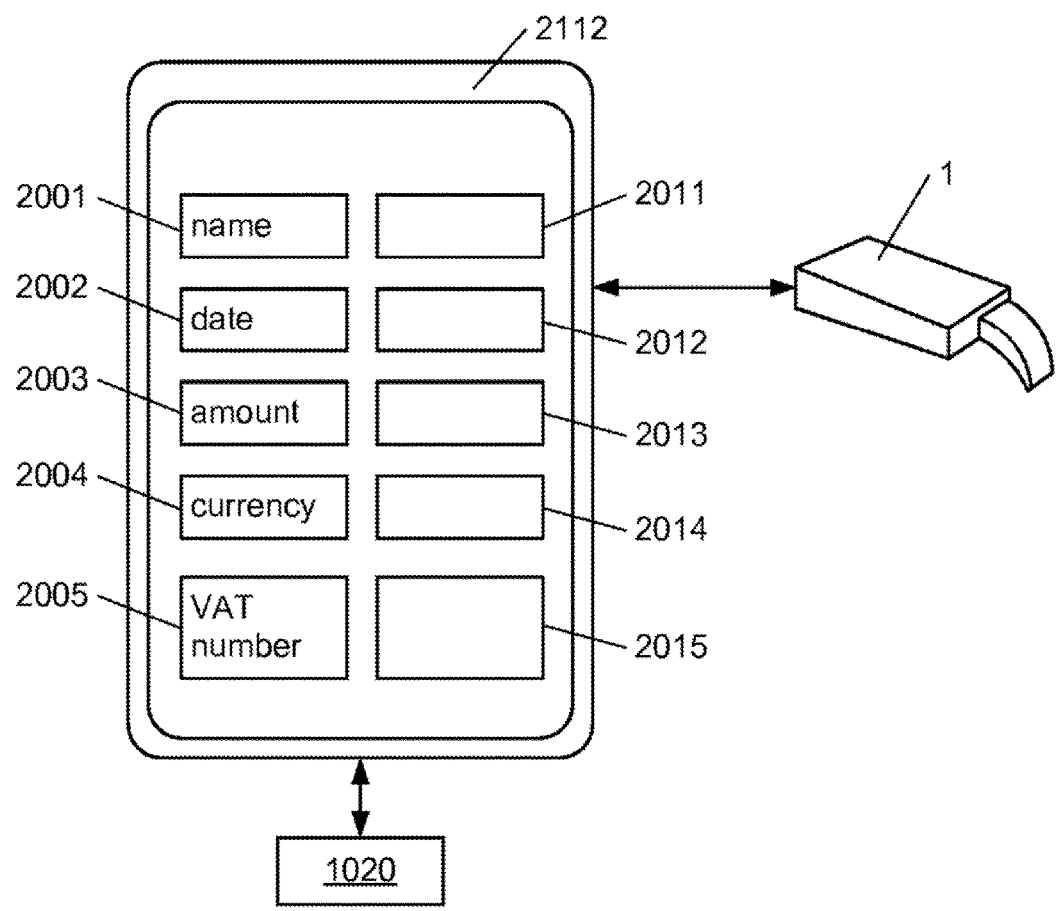
FIG. 16 illustrates the system including a hand-held scanning device, a mobile device and a remote computer according to an embodiment of the invention, with an intelligent data recognition application for invoices running on the mobile device.
Figure 17:
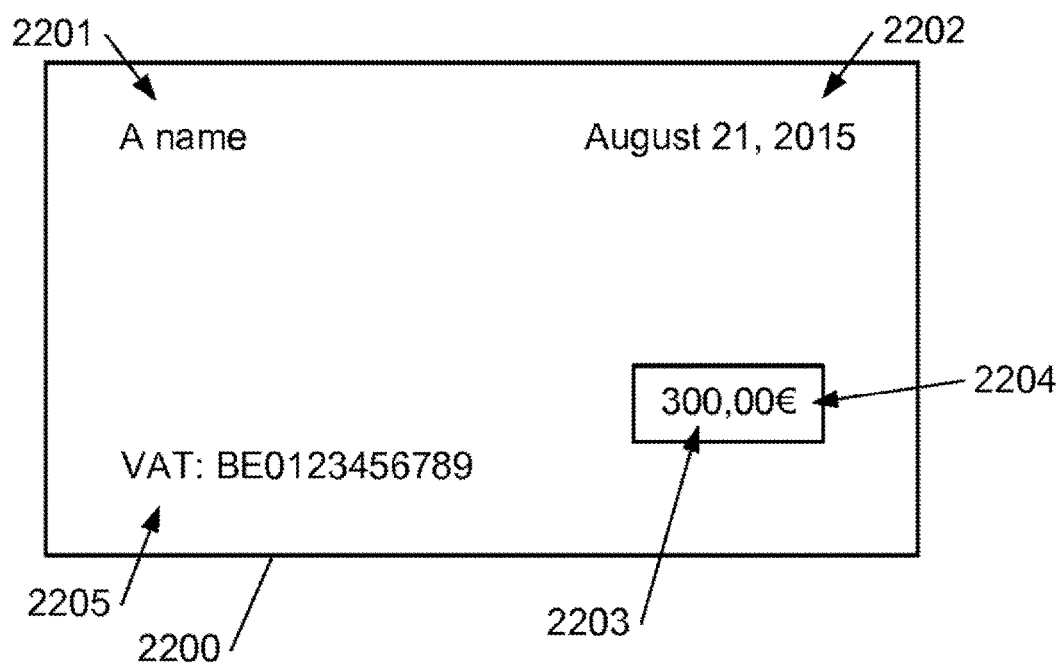
FIG. 17 illustrates an invoice that provides information to enter in the intelligent data recognition application, according to an embodiment of the invention.
Figure 18:
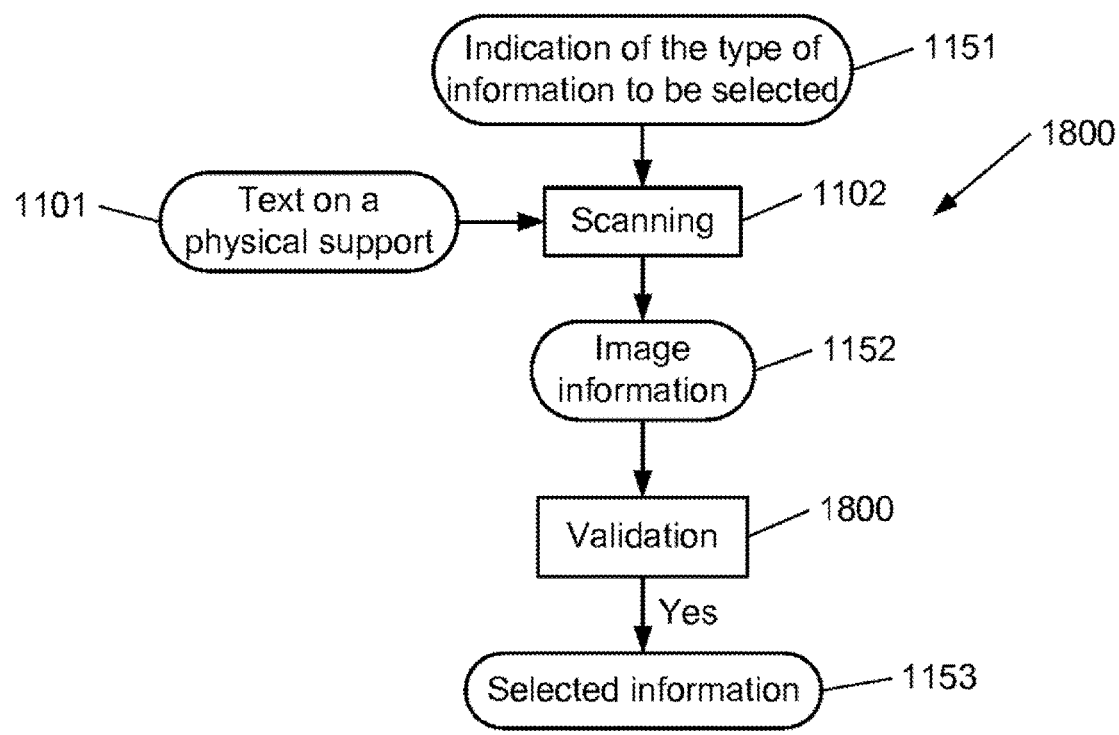
FIG. 18 shows a flowchart of a process flow to select information from a text on a physical support, according to an embodiment of the invention.

FIGS. 16 and 17 illustrate how the hand held scanning device 1 may be used to select information in a hardcopy document like an invoice 2200. For example, it can be used for entering the data of an invoice into an ERP system FIGS. 16 and 17 are described in parallel with FIG. 18 illustrating a corresponding process flow 1800 to select information on a physical document or an object.

The mobile device 2112 runs an application, for example an APP for IDR, preferably linked to an IDR software running on the remote computer 1020. The mobile device 2112 displays a plurality of parameters to be entered in the IDR APP for the IDR of the invoice 2200, namely a name 2001 of the document, a date 2002, an amount 2003, a currency 2004 and a VTA number 2005. The APP interface also displays empty fields 2011, 2012, 2013, 2014, 2015 to be filled with these parameters.

The APP interface gives an indication of the type of information to be selected 1151, for example by displaying a bar in the empty field 2011 for the name, by highlighting the field to be selected or any other indication. The type of information can be a name (e.g. provider name), a date, an amount, a currency, a VAT number, an email address, a street address, a bank account or any string of characters, . . . .

The user then takes the hand-held scanning device 1, selects on the invoice 2200 the position of the text (here the name 2201) corresponding to the type of information to be selected and scans it (step 1102). The hand-held scanning device 1 performs the scanning (step 1102), which generates an image information 1152. The image information 1152 is preferably the acquired image 1110 described above.

The image information 1152 is used as input for a validation 1900. If the validation 1900 is performed on the remote computer 1020, the image information 1152 is sent from the hand held scanning device 1, via the mobile device 2112, to the remote computer 1020.

Figure 19:
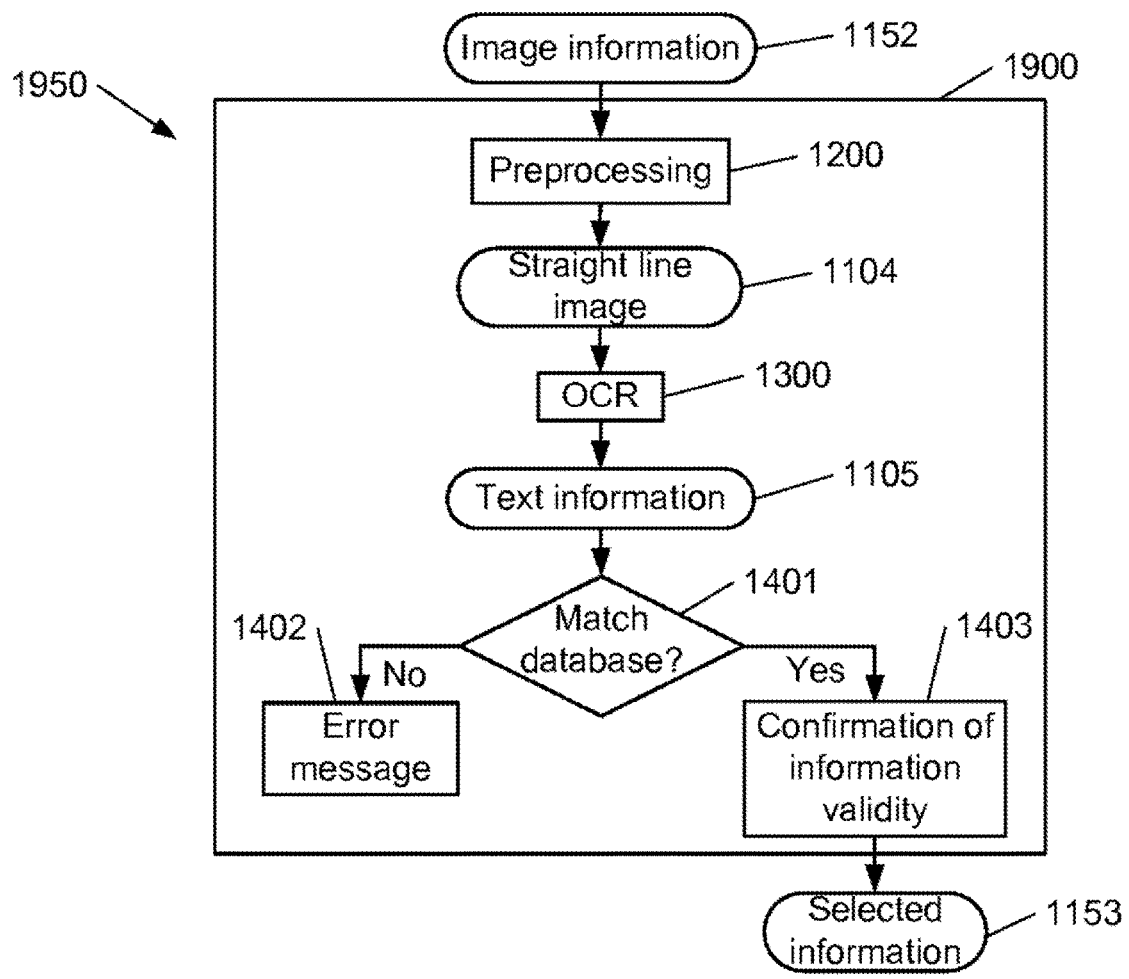
FIG. 19 shows a flowchart of a process flow for validation of information, according to an embodiment of the invention.

A possible process flow 1950 for the validation 1900 is illustrated at FIG. 19. The validation 1900 is a verification that the image information 1152 corresponds to what is expected for the type of information that was requested by the indication of the type of information to be selected 1151.

The validation 1900 can include one or several of the following steps:
an image comparison,
a check that the image information 1152 includes a string of characters,
a counting of the number of characters,
a check that the characters include a given type of character, for example a @ for an email address,
a check that the characters represents a date,
a check that the characters are
numbers,
letters,
a string of a predetermined number of characters,
a string with numbers and letters at predetermined places,
one kind of string amongst several kinds of strings,
a string which matches a regular expression.

For example, for a VAT number, the validation 1900 can check that the image information 1152 contains two letters and at least a number of digits. Furthermore, the validation 1900 could check if these two letters correspond to a country code and possibly that the number of digits correspond to the number of digits expected for a VAT number of this country.

For example, for a date, the validation 1900 can check that the format is one of the typical formats for a date, including a day number, a month number or name, and a year number.

For example, for an amount, the validation 1900 can check that the image information 1152 contains a number.

For example, for a currency, the validation 1900 can check that the image information 1152 includes a currency symbol or a currency abbreviation.

Easy validation 1900 such as verifying the number of characters can be performed on the mobile device. More complex validation 1900 however may preferably be performed on the remote computer 1020. If the validation 1900 indicates that the image information 1152 corresponds to the type of information that was requested by the indication of the type of information to be selected 1151, the image information 1152 is validated and provides selected information 1153. The selected information 1153 is sent to the IDR APP on the mobile device 2112 and displayed in the corresponding field on the display of the mobile device. For example, on the field 2011 for the name of the invoice 2200, the validation may be limited to verifying the type of characters which may be performed on the mobile device. For the field 2015 however, for which a VAT number is to be selected, the validation 1900 may be performed on the remote computer to be able to verify if the scanned information is corresponding to one of a list of valid VAT numbers in a table or database on the remote computer. Alternatively, instead of sending the information back from the remoter computer to the mobile device, a message indicating that the image information 1152 is validated may be sent from the remote computer 1020 to the mobile device 2112.

The selected information 1153 may include the image information 1152, for example if this image information 1152 is a digital image.

The validation 1900 can include an OCR process 1300 and/or a data extraction (IDR) process 1801 (shown on FIG. 14). If the validation 1900 includes an OCR 1300, the selected information 1153 preferably includes the text information 1105 generated by the OCR 1300. If the validation 1900 includes an IDR, the IDR is preferably performed by the remote computer 1020.

Once a field is completed in the APP, the APP interface provides an indication of the next type of information to be selected (step 1151), which can be the date 2002 of the invoice, that the user can select and scan at the position 2202 of the invoice. The process flow 1800 can be performed for all the fields 2011-2015 of the APP interface, which correspond to texts 2201-2205 on the invoice 2200. If the process flow 1800 does not work or if the image information 1152 is not validated at step 1900, the APP interface can display an error message, for example asking the user to manually enter the information to be selected. Once the process has been performed for all the fields, the user can trigger a transmission of the invoice data to the ERP system.

With the process flow 1800 described above for selecting information, there is no need to scan a full document and to process the full information with OCR and IDR to determine a predetermined type of information such as for example date, amount, VAT number and many other types of information. Furthermore, the validation of the information verifies the type of information selected by the pen scanner reducing possible mistakes significantly.

FIG. 19 illustrates the process flow 1950 for the validation 1900 according to an embodiment of the invention. The validation 1900 includes the pre-processing 1200 and the OCR 1300 as described with reference to FIG. 14.

The pre-processing 1200 can be performed on the hand-held scanning device 1, the mobile device 2112 or the remote computer 2010 as described above. The OCR 1300 can be performed on the mobile device 2112 or the remote computer 2010 as described above. If the OCR 1300 is not performed by the remote computer 2010, the text information 1105 is sent to the remote computer to be used as input for a check 1401 with a database present on the memory 1021 (shown on FIG. 13).

In the process flow 1950 for the validation 1900, the text information 1105 preferably includes all the possible IDs of the characters of the straight line image 1104 determined during the OCR 1300, with the probability associated with each of them.

The check 1401 can be performed by an IDR software running on the remote computer 2010 and connected to the IDR APP running on the mobile device 2112. The check 1401 with a database compares the text information 1105 with strings of characters contained in a database. The check 1401 starts preferably by looking for a match between a string of character in the database and the most probable ID of characters in the IDs of the text information 1105. If there is no match, a fuzzy search can be performed to find, amongst all the IDs of the characters included in the text information 1105, an ID that matches a string of character present in the database. This ID is then considered as the selected information 1153.

For example, if the field corresponding to the indication of the type of information to be selected 1151 is "name of invoice provider", the identification with the highest probability in the text information 1105 is Lowson and the database includes a list of providers which does not include Lowson but does include Lawson, the fuzzy search is able to find the name Lawson and returns a "match".

If there is a match between the text information 1105 and a string of character, the validity of the image information 1152 is confirmed 1403. This confirmation is sent to the mobile device 2112. The text information 1105 is then preferably provided to the mobile device 2112, if it does not have it yet, and displayed by the IDR APP interface.

If the database contains additional information corresponding to the text information 1105, this additional information can also be outputted and sent to the mobile device 2112 or used for further processing, for example in IDR, on the remote computer 1020. For example, the database can include a list of VAT numbers and matches VAT numbers and provider names. If the text information 1105 includes a VAT number of the list, the name of the corresponding provider can be outputted.

If there is no match, an error message 402 is returned, sent to the mobile device 2112 and displayed on the mobile device 2112. Such an error message may be, for example, to ask the user to scan the text on the physical support 1101 again or to ask the user to perform a manual entry of the text shown on the physical support 1101.

What is claimed is:

1. A method for correction of an image acquired by a hand-held scanning device wherein the image has at least one central text portion which is distorted by instantaneous change of scanning direction of the hand-held scanning device relative to an image to be acquired, the method comprising the steps of binarizing the image acquired by a hand-held scanning device to become a binarized image of first and second components, cropping the binarized image to become a cropped image by removing columns on the left end and on the right end of only first components, creating a work image from the cropped image by replacing in each row of components series of first components smaller than a predetermined distance with series of second components,
identifying in the work image a central line, the identifying step comprising
selecting first connected components for which a leftmost triplet is part of the leftmost column of the cropped image,
determining couples of first connected components of which the distance between the middle points of the leftmost triplets is between a predetermined range,
selecting in the couples of first connected components the couple of first connected components nearest to the middle of the cropped image in the column direction, and
determining the central line as the components between the selected couple of first connected components,
the method further comprising
determining in the cropped image the components corresponding to the central line in the work image as a central text line to create a central line image, and
straightening the central text line in the central line image to become a corrected image.

2. The method according to claim 1, wherein the step of straightening the central text line comprises
blurring the central line image to become a blurred image,
determining in the blurred image for each column of component a gravity centre of second components, and
translating for each column the gravity centres such that the gravity centres forming a horizontal line.

3. The method according to claim 1, wherein the first components are white components and the second components are black components.

4. The method according to claim 1, wherein the method further comprises the step of applying a variable speed correction to the acquired image before binarizing.

5. The method according to claim 4 wherein the step of applying speed correction comprises mechanically measuring the speed variations of the hand-held scanning device with respect to the image to be acquired.

6. The method according to claim 1, wherein the method further comprises the step of applying a variable speed correction to the corrected image to become a second corrected image.

7. The method according to claim 6 wherein the speed correction comprises calculating local correction factors based on font information.

8. The method according to claim 7 for identifying characters in the scanned image, the method further comprising the step of applying a character recognition process on the second corrected image to become text information.

9. The method according to claim 8 for identifying data information in the scanned image, the method further comprising the step of applying a data extraction process on the text information to become classified text information.

10. A hand-held scanning device for scanning an image and for pre-processing the image for pattern recognition, the device comprising
an optical sensor for scanning an image having at least one central text portion,
a processor for correcting the scanned image, and
a storage containing a program executable by means of the at least one processor and comprising:
first software code portions configured for binarizing the scanned image in a binarized image of first and second components,
second software code portions configured for cropping the binarized image to a cropped image by removing columns on the left end and on the right end of only first components,
third software code portions configured for creating a work image from the cropped image by replacing in each row of components series of first components smaller than a predetermined distance with series of second components,
fourth software code portions configured for identifying in the work image a central line, the fourth software code portions comprising
software code portions configured for selecting first connected components for which a leftmost triplet is part of the leftmost column of the cropped image,
software code portions configured for determining couples of first connected components of which the distance between the middle points of the leftmost triplets is between a predetermined range,
software code portions configured for selecting in the couples of first connected components the couple of first connected components nearest to the middle of the cropped image in the column direction, and
software code portions configured for determining the central line as the components between the selected couple of first connected components,
the program further comprising
fifth software code portions configured for determining in the binarized image or in the cropped image the components corresponding to the central line in the work image as a central text line to create a central line image, and
sixth software code portions configured for straightening the central text line in the central line image to a corrected image.

11. The handheld scanning device according to claim 10, further comprising a wireless communication module for communicating images to a wireless communication module of a mobile device.

12. A system for correction of an image having at least one central text portion which is distorted by instantaneous change of scanning direction relative to an image to be acquired, the system comprising at least one processor and an associated storage containing a program executable by means of the at least one processor and comprising:
first software code portions configured for binarizing the scanned image in a binarized image of first and second components,
second software code portions configured for cropping the binarized image to a cropped image by removing columns on the left end and on the right end of only first components,
third software code portions configured for creating a work image from the cropped image by replacing in each row of components series of first components smaller than a predetermined distance with series of second components,
fourth software code portions configured for identifying in the work image a central line, the fourth software code portions comprising
software code portions configured for selecting first connected components for which a leftmost triplet is part of the leftmost column of the cropped image,
software code portions configured for determining couples of first connected components of which the distance between the middle points of the leftmost triplets is between a predetermined range, software code portions configured for selecting in the couples of first connected components the couple of first connected components nearest to the middle of the cropped image in the column direction, and software code portions configured for determining the central line as the components between the selected couple of first connected components, the program further comprising fifth software code portions configured for determining in the binarized image or in the cropped image the components corresponding to the central line in the work image as a central text line to create a central line image, and sixth software code portions configured for straightening the central text line in the central line image to a corrected image.

13. The system according to claim 12, wherein the system comprises a handheld scanning device for scanning the image and a mobile device comprising the processor and the associated storage.

14. The system according to claim 12, wherein the handheld scanning device comprises a wireless communication module to communicate with a second wireless communication module in the mobile device.

* * * * *